(12) United States Patent
Rast

(10) Patent No.: US 6,963,293 B1
(45) Date of Patent: Nov. 8, 2005

(54) SYSTEM AND METHOD OF PREVENTING AIRCRAFT WINGTIP GROUND INCURSION

(75) Inventor: Rodger H. Rast, Rancho Cordova, CA (US)

(73) Assignee: Rastar Corporation, Gold River, CA (US)

( * ) Notice: Subject to any disclaimer, the term of this patent is extended or adjusted under 35 U.S.C. 154(b) by 288 days.

(21) Appl. No.: 10/245,909

(22) Filed: Sep. 15, 2002

Related U.S. Application Data

(63) Continuation-in-part of application No. 09/854,028, filed on May 11, 2001, now Pat. No. 6,486,798.
(60) Provisional application No. 60/394,160, filed on Jul. 1, 2002, and provisional application No. 60/203,564, filed on May 11, 2000.

(51) Int. Cl.[7] ............................................. B64D 47/06
(52) U.S. Cl. ...................... 340/981; 340/958; 340/961; 362/470
(58) Field of Search ............................ 340/958, 932.2, 340/903, 435, 642, 961, 946, 981, 982; 362/420, 472; 244/114 R; 701/301; 315/293, 77, 246, 90, 294

(56) References Cited

U.S. PATENT DOCUMENTS

| | | | | |
|---|---|---|---|---|
| 4,495,549 A | * | 1/1985 | Carlson et al. | 362/470 |
| 4,527,158 A | * | 7/1985 | Runnels | 340/961 |
| 5,719,568 A | * | 2/1998 | Adams | 340/961 |
| 6,011,493 A | * | 1/2000 | Bushell et al. | 340/981 |
| 6,278,382 B1 | * | 8/2001 | DeMarco et al. | 340/981 |
| 6,439,752 B1 | * | 8/2002 | Petrick | 362/470 |
| 6,486,798 B2 | * | 11/2002 | Rast | 340/961 |

\* cited by examiner

*Primary Examiner*—Brent A. Swarthout
(74) *Attorney, Agent, or Firm*—Rodger H. Rast

(57) ABSTRACT

An apparatus and method for tracking aircraft wingtip position during taxi operations to prevent wingtip ground incursion. A patterned illumination source is attached proximal the wingtips to project a readily discernable target pattern in the direction of taxi travel. At least a portion of the target pattern is reflected off of any obstructions that lie in the straight-line direction of travel, such that the pilot can maneuver to avoid striking the obstruction. By way of example, the patterned illumination source comprises a laser module positioned with the navigation and/or strobe light of the aircraft. The device may be retrofitted to existing aircraft without additional wiring with the control of activation being selectable via power cycling of existing aircraft lighting controls. One aspect of the invention provides a tip tracking module bulb that may be retrofitted into existing light sockets to simplify system installation.

19 Claims, 18 Drawing Sheets

SYSTEM AND METHOD OF PREVENTING AIRCRAFT WINGTIP GROUND INCURSION

CROSS-REFERENCE TO RELATED APPLICATIONS

This application is a continuation-in-part of application Ser. No. 09/854,028 filed on May 11, 2001 which issued as U.S. Pat. No. 6,486,798 on Nov. 26, 2002, and also claims priority from U.S. provisional application Ser. No. 60/394,160 filed Jul. 1, 2002, and U.S. provisional application Ser. No. 60/203,564 filed on May 11, 2000.

STATEMENT OF FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to aircraft safety systems and more particularly to a system and method for preventing collisions between the wingtips of an aircraft moving on the ground and obstructions.

2. Description of the Background Art

Aircraft are subject to a variety of collision situations both in the air and on the ground. Air traffic control equipment and infrastructure assures safe flight paths. Recently, advanced GPS systems have been proposed to allow pilots to verify separation between themselves and other aircraft.

Yet one form of collision situation has not been fully addressed are the ground incursions that can occur when an aircraft is being taxied near other aircraft and obstructions. These ground incursions may be of the "hangar rash" variety, while in other cases enough damage is sustained to render the aircraft unairworthy.

Airports are often overcrowded with aircraft, while the taxiways are small and may be subject to further encroachment by poorly-parked aircraft. The problem is especially difficult for pilots taxiing in small airports as it is difficult to maneuver the typical 25–40 foot wingspan of a private aircraft or small commercial aircraft amidst a crowded taxiway while keeping the tips from striking other aircraft or obstructions that exist alongside the taxiway. In order to maintain clearance from other aircraft, the pilot must look in front of the aircraft while closely monitoring the wingtips on either side of the aircraft.

The difficulty in judging whether a distant wingtip may strike a distant obstruction, such as the empennage, propeller, or wingtip of another aircraft, should be appreciated. For example, if the tip of the wing is twenty feet (20 ft.) from the pilot, then the pilot must attempt to verify that the nearby obstructions are more than twenty feet (20 ft.) away. Any error in making this distance judgment can lead to damages to both aircraft. The situation is far different from a driver attempting to park a car, because a driver is close enough to the periphery of a car, or even a side of the motor home, to judge the side-distance and generally may only require help in judging the in-line distance to the obstruction.

In considering an aircraft, however, the position of the obstruction is far removed and distance must be judged in relation to a wingtip which is also far removed from the pilot. During taxiing the pilot is continually attempting to judge if an obstruction is in a forward line with one of the other wingtip. Furthermore, it will be appreciated that the pilot must correctly judge the distance well before the tip of the wing approaches the obstruction so that sufficient maneuvering room exists for getting around the obstruction.

As few aircraft have the ability to reverse engine thrust during low speed ground operations, the pilot facing insufficient clearance situation is required to shut down the aircraft and use a tow-bar or get the assistance of a tug if an obstruction is detected too late, such that insufficient maneuvering room exists. The lack of clearance information coupled with the "embarrassment" of exiting the aircraft to check if proper clearance is available or to back up the aircraft, leads many pilots to push a bad situation wherein damage is often the result. In some cases the situation is further aggravated when damage is not reported and aircraft having structural damage or damaged lighting systems may be flown.

As can be seen, therefore, the development of an apparatus and method for tracking wingtip position in relation to forward obstructions can prevent a number of minor collisions, and reduce "hangar rash". The system and method of preventing aircraft wingtip ground incursions in accordance with the present invention satisfies that need, as well as others, and overcomes deficiencies in previously known techniques.

BRIEF SUMMARY OF THE INVENTION

The present invention is a system and method for tracking the relative position of the wingtips of an aircraft by utilizing an illumination pattern projected forward of the wingtip to aid the pilot in judging the proximity and relative alignment of nearby aircraft or obstructions. The system employs a set of forward projecting beams, such as from a laser light source, which are configured on the aircraft to project forward of the wingtip a two dimensional pattern to illustrate conditions of an impending collision so that the pilot can easily avoid the obstruction.

The beams are projected from the wingtip in a pattern that preferably yields information to the pilot as to both obstruction forward distance and lateral distance. The beams are preferably projected as patterns which shown up as two dimensional when striking an obstruction surface. It will be appreciated that a single dot of illumination or even a line does not provide distance information and furthermore it can not provide information as to the relative lateral separation. By way of example and not of limitation, the beams may be projected as circles, cross-hairs, boxes, and so forth, whose projected size is an indicator of forward distance, and whose projected position on a subject obstruction determines the amount of the obstruction that may be struck should the aircraft continue traversing a straight path.

A number of embodiments are described for implementing the patterned illumination source and control of the present tip tracking system. It will be appreciated that multiple illumination sources may be incorporated to more precisely gauge distance, or angle, or for aiding with the detection of distance for other aircraft surfaces, such as the tail surfaces. For example, one embodiment is exemplified utilizing a pair of central vertical-fan laser beams coordinated with spiral-rotation laser beams on the tips wherein the distance and relationship of the wingtip and the upcoming object is represented by the light pattern thrown-up on the obstruction.

The cross section of the projected illumination is preferably a discernable two-dimensional pattern, such as circular.

The pattern may be formed dynamically, such as nutating pattern, or statically, such as with a grating or mask. A nutating pattern is preferred subscribes a conical pattern. One preferred spread angle for the pattern provides a circle diameter in feet $C_f=D/5$. At five feet from an obstruction the circle diameter is one foot while at ten feet the circle diameter would be two feet. Having one or more predetermined spreads allows the pilot to very accurately gauge both the forward and lateral distance from the wingtip to possible obstructions. The speed of rotating pattern being preferably sufficiently rapid so as to be perceived as a circle, but slow enough that the beam motion within the pattern is discerned. Preferably the nutation is generated between about 80–200 RPM.

The angle of the pattern being projected may be fixed, or controlled within the present system either manually or automatically. For example, the unit may generate a sequence of pattern sizes (pattern angle spreads) wherein different conditions, such as turning may be automatically accommodated. This may be accomplished using a mechanical nutation actuator, for instance one that alters the diameter of nutation in response to changes in rotational speed. Alternatively, the user can be allowed to select the angle over which the pattern is generated.

The tip tracking system may include a single patterned illumination unit installed near each wingtip of the aircraft, such as retrofitted within a navigation light, strobe light, landing light, or otherwise connecting into electrical systems of the aircraft. Embodiments are described for adding the tip tracker system to an aircraft being built, and for modifying existing aircraft to accommodate the tip tracking functionality. Embodiments are described in which the patterned illumination element of the tip tracking system may be installed as a module, integrated with a tip lighting element, or installed as a replacement lighting element (i.e. bulb) that may be readily retrofitted to existing aircraft. Within a replacement bulb, the patterned illumination source (i.e. laser) is colocated with the traditional navigation lighting element (or a substitute thereof), wherein an extremely simple installation is assured. A replacement bulb providing similar aspects of the tip tracking system may be created for other applications as well, such as in other forms of vehicles that are currently provided with incandescent bulbs, for instance automobiles.

Although, clearance is not typically a problem in automobiles the illumination may be provided to attract additional attention and/or as an entertainment or customization element. The additional projective illumination source (i.e. laser) in this instance it is preferably oriented substantially toward the top of the bulb. The illumination by the laser may also be preferably adjusted so that it is directed down toward the ground so as not to become a nuisance to other drivers.

An object of the invention is to provide additional positional feedback to the pilot of the aircraft relating the position of their wingtips to nearby obstructions.

Another object of the invention is to create a tip tracking system that provides a forward distance reference for the pilot between a wingtip and a possible obstruction.

Another object of the invention is to create a tip tracking system that provides a lateral distance reference which indicates if a collision on a straightforward travel path is likely.

Another object of the invention is to provide a tip tracking system that may be easily implemented on existing aircraft.

Another object of the invention is to provide a tip tracking system that does not require that additional wiring be routed through the wings of an aircraft.

Another object of the invention is to provide a system of tip tracking that is reliable for both day and night operations.

Another object of the invention is to provide a system that can optionally provide very accurate distance information from the aircraft to obstruction.

Another object of the invention is to provide feedback to the pilot so that operation of the system can be verified.

Another object of the invention is to provide an automatic means of shutting down the tip tracking system to reduce the likelihood of inadvertent airborne operation.

Another object of the invention is to provide a tip tracking system that may be mounted to the airframe with minimal airflow disruption and commensurate drag.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF INVENTIVE EMBODIMENT

Referring more specifically to the drawings, for illustrative purposes the present invention is embodied in the apparatus generally shown in FIG. 1 through FIG. 30. It will be appreciated that the apparatus may vary as to configuration and as to details of the parts without departing from the basic concepts as disclosed herein.

1. Introduction.

Figure 1:
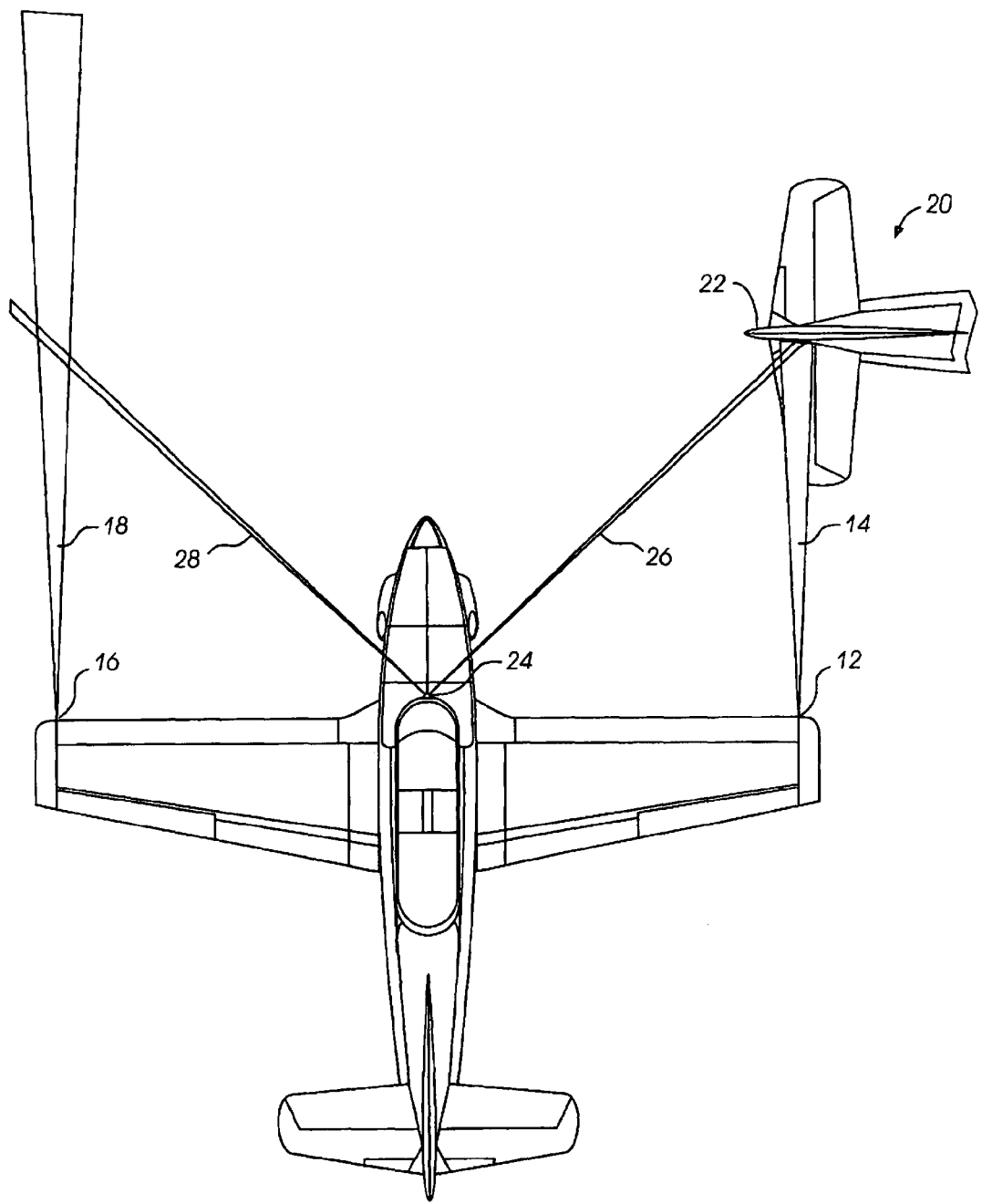
FIG. 1 is a plan view of an aircraft which is in imminent danger of collision during taxiing, wherein the tip tracking system according to the present invention has illustrated the impending collision to the pilot by "painting" a circle on the upcoming obstruction.

FIG. 1 illustrates an embodiment of the tip tracking system in use while an aircraft 10 taxies toward an obstruction. The illustration depicts a single obstruction being designated by the system, however, it will be appreciated that in general the pilot has sporadically spaced obstructions on each side and is attempting to navigate a path between the obstructions, a path in which the wing tips are not to contact obstructions on either side. The tip tracking system comprises a first wingtip illumination (light) pattern projection source 12, such as a laser, which casts a beam 14, a second wingtip light pattern projection source 16 which casts a beam 18. Beam 14 in the figure is shown being reflected by a portion of the tail surface of obstructing aircraft 20 primarily on the vertical stabilizer 22. When the beam strikes an obstructing surface it can be said to be "painting" the obstruction, in a similar pattern of terminology utilized for radar equipped fighter aircraft.

1.1 Light Intersection Distance Correlation Unit.

An optional distance correlation unit is implemented as a twin beam distance correlation unit 24, which is shown projecting additional distance reference patterns 26, 28, such as vertical slit beams, to accurately register distance information on the same obstruction.

1.2 Tip Mounted Projective Illumination Sources.

The illumination pattern projection source 12, 16 are preferably attached to the wingtips on the farthest protruding section of the tip, however, it is represented by this figure that the beams can still be utilized when attached more inwardly if mounting limitations exist. The angle over which the pattern is projected allows useful lateral distance information to be provided even when the beam is emanating inboard of the wingtip. A significant advantage accrues, however, as a result of mounting the beams on the farthest extension of the wing, wherein the projected beam is capable of registering lateral obstruction distance in a highly accurate manner even as the closing distance is reduced to only inches.

The tip tracking beams are shown directed in a horizontal plane relative to the aircraft in a taxi configuration and positioned in line with a forward direction of travel such that the beam is painted on a portion of any obstruction that may interfere with the forward movement of the wingtip. In use on a crowded airfield the pilot can maneuver the aircraft so that equal fringes of projection appear on opposing sides of the aircraft when traveling in a straight taxi path. If the pilot has sufficient clearance, then as the aircraft gets closer to the obstruction the projected patterns will no longer "paint" the obstruction, that is they will no longer be visible on the obstruction. If the edge of the beam is still painting a surface as the pilot and aircraft draw near, then the pilot should maneuver in the opposite direction if sufficient clearance exists on that other side of the aircraft. It will be appreciated that the beams travel generally in a forward direction and thereby when turning, the distance for which the tip tracker correctly paints an obstructing surface will be reduced.

1.3 Conical Patterned Illumination.

One preferred beam pattern is that of a circular cone which subtends an are of preferably five to ten degrees (5°10°) that is generally not to exceed twenty degrees (20°). The shape of the pattern can be altered to comprise any recognizable two-dimensional pattern of sufficient size that will provide forward distance and lateral distance feedback to the pilot. Projecting a single laser beam, however, is prone to mislead the pilot and provides minimal recognition regardless of dimension, while the non-unique, not easily discernable pattern is easy to miss when "painting" obstructions.

The use of a small beam would be further hindered by the fact that the wingtip is of finite dimensions and a small beam would not provide a range warning or a degree of clearance for the wing. Furthermore, the obstruction may contain irregularities, such as cutouts, voids, notches, and grooves, that may conceal a small patch of light.

1.4 Other Patterns of Illumination.

It will be appreciated that the patterning of the projected illumination preferable comprises the projection of a two dimensional pattern onto an obstruction surface, such as a circle, square, ellipse, and so forth which has both horizontal and vertical components and for which size may be relatively easily gauged by a pilot as an indicator of wingtip to obstruction distance, and lateral distance. The aforementioned pattern may be created in the illumination by a number of known mechanisms, for example, optical masks, graticules, lenses containing masks, faceted lenses, mirrored reflectors, optical redirection, and mechanical redirection. The latter approach is utilized within this embodiment with the wingtip beams being projected as circularly rotating beacons to increase recognition and interface with the upcoming surface. Rotation is generally preferred over using a circular graticule as it provides more apparent light to the eye and greater ease of recognition traversing over varied surfaces. A moving mirror or lens may also be utilized for redirecting the projected beam to traverse a desired pattern. However, it will be appreciated that the use of a graticule or other light pattern spreading mechanism can generally be implemented within the present invention at a slightly lower cost and within a more compact form factor.

1.5 Illumination Sources.

The preceding generally describes the use of a laser light source as it provides a high intensity collimated beam of projected light. Other sources of illumination may be alternatively utilized, such as non-collimated light sources of sufficient intensity, such that the amount of patterned light which is projected in the direction of travel is sufficient for the pilot to properly discern distances. A non-collimated light source may alternatively be collimated into a projected patterned beam by the use of lenses, mirrors, or housings which partially surround the light source and allow a column of light to escape from an aperture therein. Numerous alternative optical mechanisms can be utilized to provide a beam covering a set forward angle (or a variable and/or adjustable angle) with light for painting the surface of a forward obstruction. The central twin beam distance correlation unit 24 is preferably implemented to cast vertical slit beams 26, 28 out forward of the wings as a vertical projection which intersects the tip beams at a fixed distance as shown. It will be appreciated that multiple beam correlation units could be utilized. A graticule or alternative optical device may be used for generating the slit beam.

Figure 2:
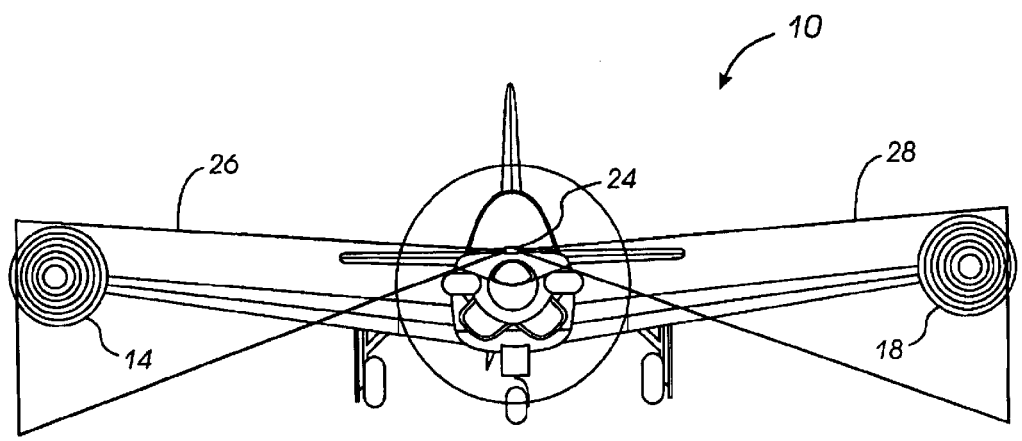
FIG. 2 is a front view of the aircraft of FIG. 1, wherein the forward emitting pattern from the lasers is shown clearly.
Figure 3:
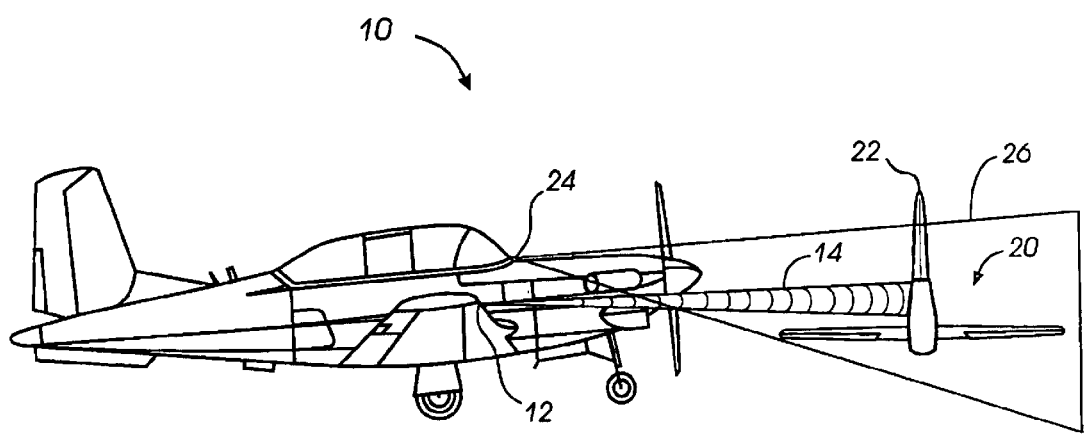
FIG. 3 is a side view of the aircraft of FIG. 2.

Alternatively the central twin beam unit may project a series of vertical projections in similar fashion to a scale wherein different forward distances are thereby represented by the intersection with the wingtip beam units 12, 16. At a predetermined fixed distance, the vertical line projected by the central twin beam unit 24 splits the circular pattern generated by one of the wingtip beams 12, 16 on the obstruction painted by the beams. It should be recognized that the diameter of the beam painted on the obstruction indicates, albeit less precisely, the distance from the wing tip to the obstruction. FIG. 2 and FIG. 3 provide additional views of the light beam patterns emitted and their interaction with the obstruction.

2. Circuit Considerations.

Figure 4:
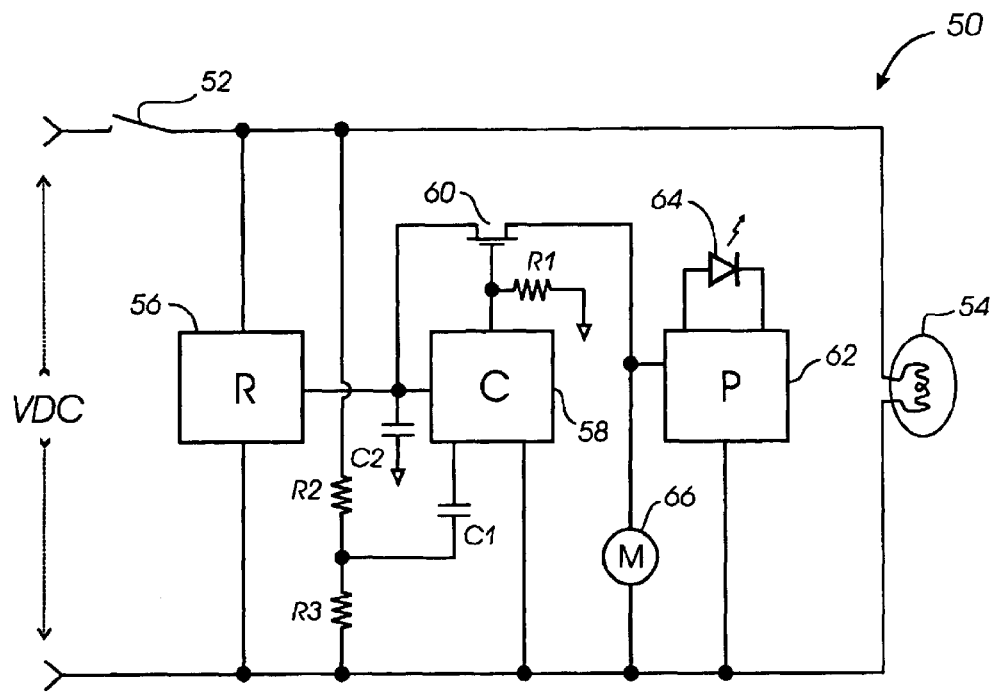
FIG. 4 is a schematic of a navigational light circuit shown with the tip tracking circuit according to one aspect of the present invention.

FIG. 4 depicts a power activation circuit 50 for driving wingtip light pattern projection sources 12, 16 as shown in FIG. 1, which by way of example are considered to be laser light sources. Power activation circuit 50 is configured to activate the patterned projection sources upon receiving an electrical signal from a control device. A number of control devices may be utilized for controlling the power activation circuit, including other devices, switches, or existing power switches that are cycled in a pattern.

2.1 Retrofit Installations.

The tip tracking system may be installed in a new aircraft with a separate control switch and a set of power control wires routed to the patterned illumination units. However, it is generally more difficult to retrofit existing installations as access is not available to the wiring or switches. Therefore, a large portion of the application addresses different modes of providing installation on existing aircraft. Conventional navigation light systems provide a direct current voltage source through an activating switch 52 to one or more incandescent tip light 54, such as running lights or colored navigation lights (either red or green).

2.2 Controlling Tip Tracker Activation.

The tip tracker circuit 50 is preferably connected into the power to the tip light such that a regulator 56 provides a stepped-down voltage to a controller 58 which is capable of modulating a switch 60, preferably a FET, through which power is provided to a laser diode power supply 62 powering a laser diode 64, and supplying power to a small motor 66 for driving the beam in a circular rotation (nutation).

The system is shown for use in an aircraft, wherein no additional control wiring need be routed from the cockpit. In this implementation the pilot merely toggles a pilot accessible activation switch mechanism, such as the running lights (nav lights) in a sufficiently predetermined pattern to create an electrical signal for detection by the power activation circuit. For example, the pilot toggles the navigation lights ON, OFF, and then ON again wherein the first ON and OFF intervals are between approximately one half second, and one and one half seconds, (½S to 1½S), which signals the power activation circuit of the tip tracker system to enable and operates the patterned projected illumination beams, laser diode 64, for a fixed period of time. Controller 58 powers-up when power is first engaged and is preferably configured with a timer circuit to disengage power to the patterned projected illumination sources after a selected interval of time has elapsed.

Controller 58 is configured to remain operating even when the power is off for a number of seconds, the amount of time being determined by the value of capacitor $C_2$ that retains a charge sufficient to sustain operation for 1–2 seconds. The controller upon power-up monitors for a subsequent OFF period (of less than 1–2 seconds) after which power is restored. Upon meeting these conditions the controller activates switch 60 to engage the laser LED and engage the motor 66. After engaging them, the controller 58 preferably metes out a period of operating time, such as one minute, after which the unit shuts down the motor and laser as they need not be operating during flight operations. If the pilot later encounters a constricted taxiway they may resequence the power to the running lights to gain additional system operating time. The circuits on the opposing wingtip and the central dual beam unit can operate with identical circuitry.

It will be appreciated that the tip tracking system may be alternatively adapted for operation directly from a source of power, wherein it operates whenever power is available to the navigation lights, or other form of system power to which it connected.

In addition, the system can be connected with the strobe unit, however, strobes typically operate from extended voltages generated by a step-up power supply located within the aircraft fuselage and run through the wiring to the wingtip—although such voltages can be converted by the power unit shown in FIG. 4, additional design considerations and compatibility issues may arise.

When deployed in a new aircraft design it may be desirable to utilize a separate switch and power routing to individually control power to the tip tracking unit. It will be appreciated that many forms of selective activation may be alternatively implemented by a person of ordinary skill in the art without departing from the present invention.

It should also be recognized that the tip tracking pattern projection lighting and control elements may be integrated within a navigation light, a combination navigation and strobe light, a strobe light, or other wingtip mounted systems.

2.3 Creation of a Nutating Pattern of Illumination.

Figure 5:
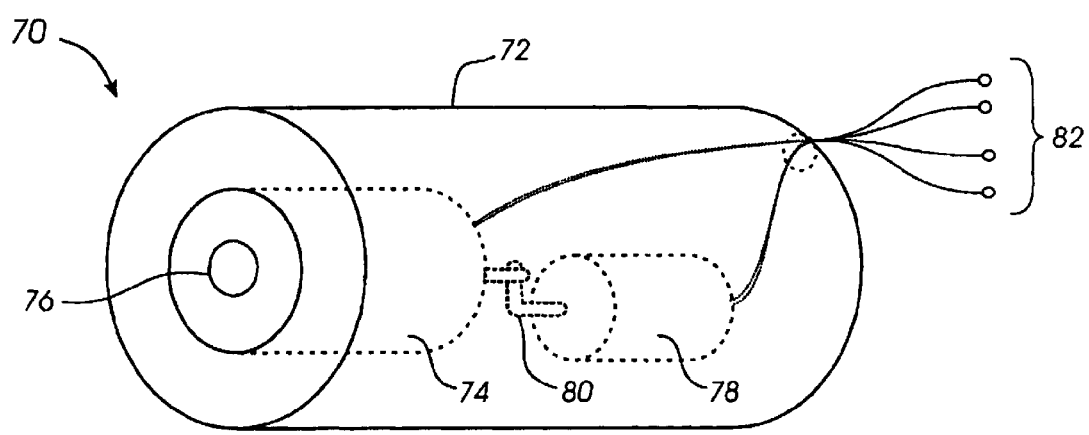
FIG. 5 is a diagram of a motor-driven rotational laser source utilized within an embodiment of the present invention.

FIG. 5 depicts a tip tracking illumination beam 70 wherein a tube 72 houses a laser diode module 74 that preferably contains the circuits 50, shown without switch 52, and incandescent light 54. A motor housing 78 is shown positioned within the tube 70 and the shaft of the motor 80 is configured with an angled crank for rotating the end of the laser 74 to provide angular rotation (nutation) thereof. The crank from the motor can also be configured with a compliant member, or a mechanism, whereby the speed of the motor can provide for modulating the angular displacement of the laser during rotation, so that the controller can generate spirals or other features by varying the speed of the motor.

The motor may be controlled by the controller independently of the laser to provide for independent actuations of the laser and motor for such features. The end of laser 74, opposite the attachment with the shaft of the motor 80 is flexibly attached within tube 70, such as by an encircling compliant ring, flexible attach points, or gimballing.

In addition, the laser 74 is preferably provided with shock mounting within tube 70, as the performance of presently manufactured laser diodes is negatively impacted when subjected to a shock force of a sufficient "G" level. Although the wingtip itself by virtue of its long-moment arm and flexible structure generally isolated from sufficiently high G impacts to damage the solid state laser element.

A number of masks, grates, lenses and so forth are available for projecting a beam with any desired pattern. In addition, nutation of the beam can be accomplished in a variety of ways. The use of a static pattern may be used in combination with nutation so as to provide enhanced recognition, such as a small circle, or cross-hairs, that are driven in a nutating pattern.

One method of creating nutation is by using actuators which impart the two axis of movement to the laser diode head to change the angle of emission. This has a number of advantages: (1) the nutation angle and speed of nutation may be changed by the controller; (2) the shape of the pattern emitted may be varied or user selected; (3) the positioning of the center of the beam may be set during a calibration phase (i.e. emit single dot and adjust center location using an input to controller which stores center value in a non-volatile memory).

By way of example, muscle wire actuators may be utilized for tilting a stage upon which the laser diode head is mounted. These may comprise muscle wire strands or actuators powered by muscle wire. A tilting mechanism described under "Controlling Articulated Elements", as described in patent application Ser. No. 10/612,777 as filed Jul. 1, 2003 and Provisional patent application Ser. No. 60/394,160 filed Jul. 1, 2002 which are incorporated herein by reference. It will be appreciated that muscle wires may be utilized in conjunction with a compliant pillar member, or stage, to modulate the tilt of the platform in an X and Y direction, wherein a circular pattern may be generated as the controller outputs drive power to change the angle so as to follow a desired circular pattern of a desired size. A number of embodiments may be created using this form of stage, or any convenient method of moving the beam in a nutating pattern. It will be appreciated, therefore, that the laser output angle may be modulated by various other means which will be readily apparent to one of ordinary skill in the art.

The light pattern projection sources may be mounted in various ways to the wingtips of an aircraft. For example, laser tube 70 can be mounted in the leading edge of the aircraft tip nacelle, or otherwise in a forward facing portion near the wingtip by various forms of mounting hardware. The tip beam and central twin beam unit may be suitably mounted on high-wing, low-wing and mid-wing aircraft. It should be recognized that other extended aircraft surfaces, such as the tips of the horizontal stabilizer, may be additionally protected in specialized instances by use of its own tip tracking system.

2.4 Use of a Separate Wingtip Housing.

Figure 6:
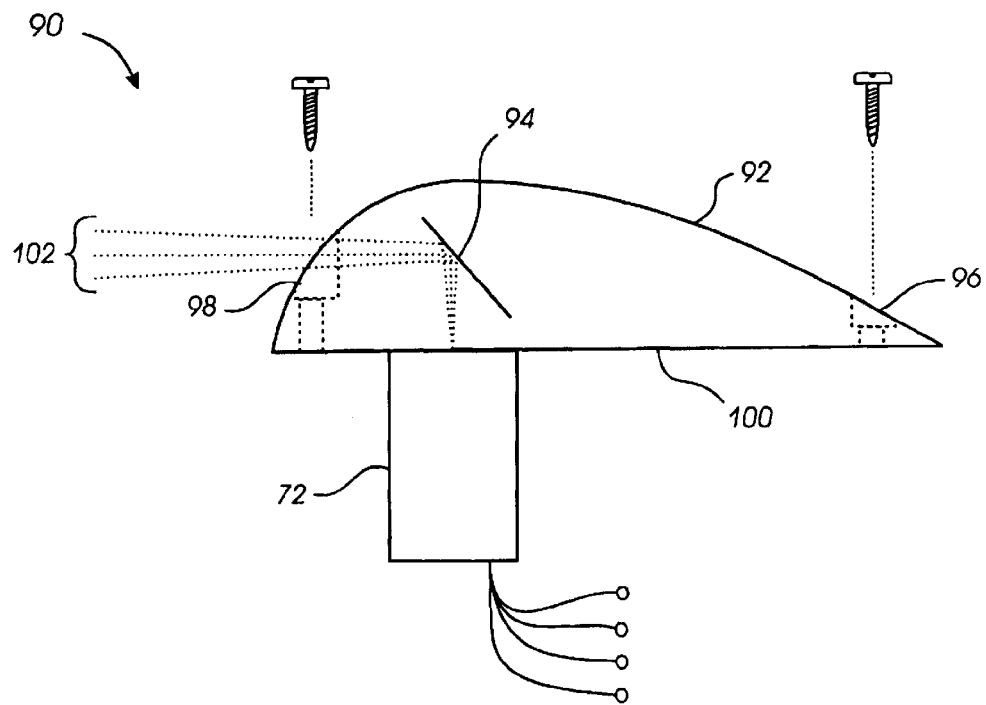
FIG. 6 is a side view of a vertically mounted wingtip laser source employing a mirror for directing the beam forward.
Figure 7:
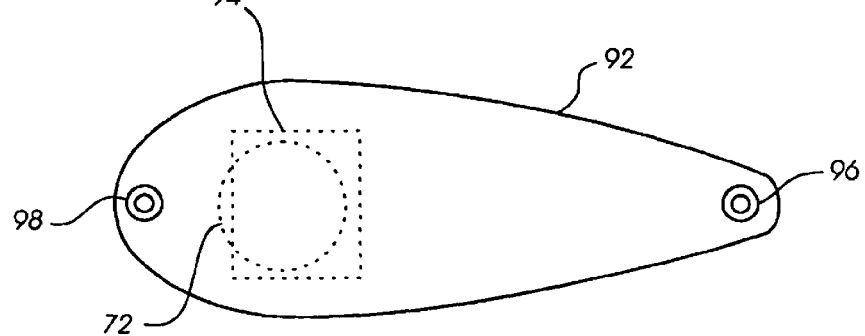
FIG. 7 is a top view of the wingtip laser source of FIG. 6.

FIG. 6 and FIG. 7 depict an easy to install wingtip beam module 90 having a teardrop shaped housing 92 that utilizes a mirror 94 for redirecting the beam forward. The housing 92 is configured with attachment points 96 and 98 to allow fasteners to engage the unit with the aircraft. The laser beam 102 is shown projected forward of the aircraft. Using the teardrop shaped housing provides for a simplified mounting of the unit to either low or high wing aircraft and facilitates adjustment. It will be recognized that additional beam adjusters, such as threadable shafts engaging the mirror, may be included to provide for additional calibration of beam position after the units have been mounted.

2.5 Preventing Tip Tracker System Activation During In-flight Operations.

Figure 8:
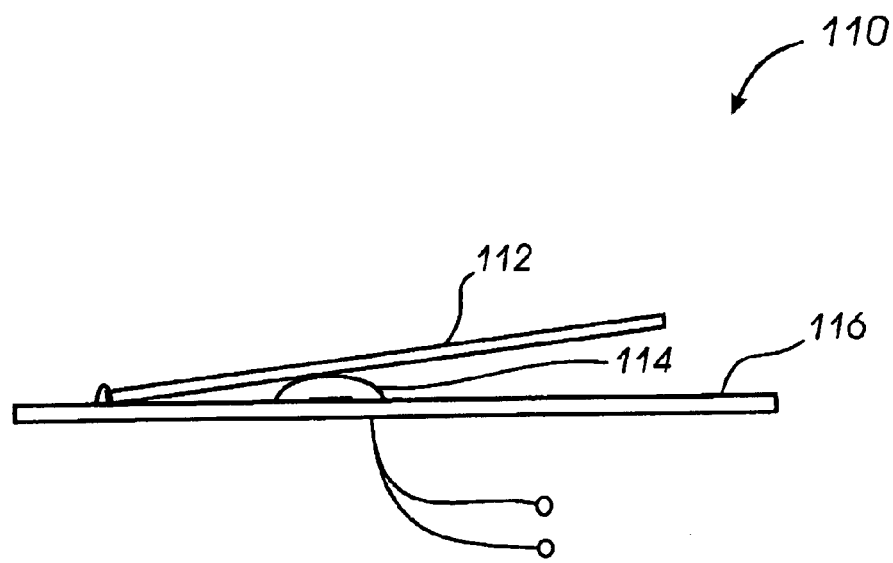
FIG. 8 is a top view of a simple form of automatic shut-off device according to an aspect of the present invention.
Figure 9:
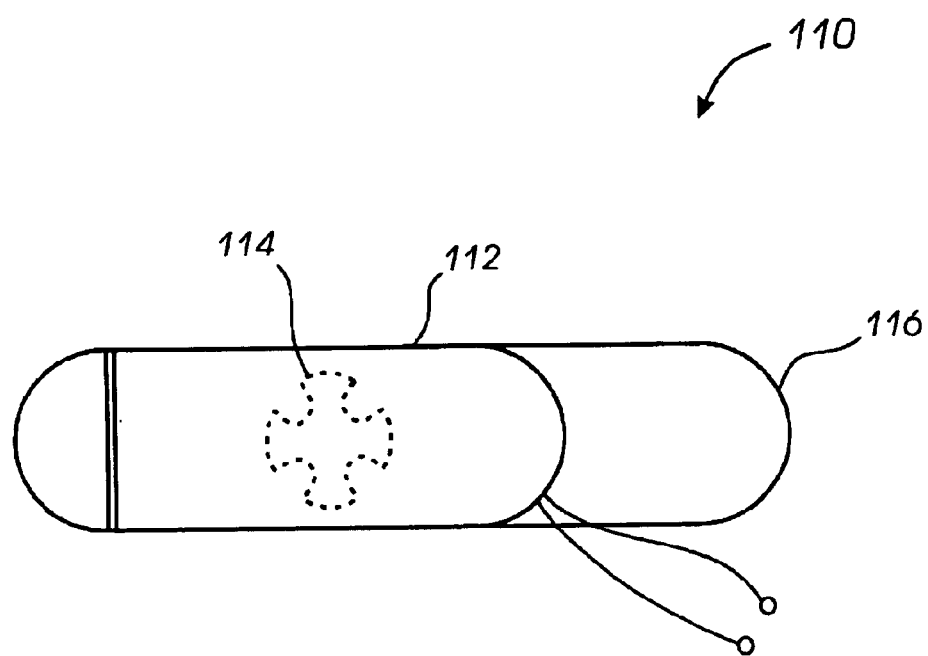
FIG. 9 is a facing view of the automatic shut-off device of FIG. 8.

FIG. 8 and FIG. 9 depict a simple automatic shut-down circuit 110 that can be employed to assure that the unit shuts down prior to becoming airborne. A bifurcated flapper style switch comprising a front surface 112 a dome contact 114 and a rear surface 116 having contacts which are electrically bridged upon the collapse of dome 114 that occurs upon a given air-pressure level being achieved.

Numerous variations of speed sensors are common in the art, wherein temperature differences, pressure differences, or acoustic changes may be sensed. When the speed of the aircraft increases beyond taxi speed the switch closure is sensed by the controller unit which shuts down the tip tracking system.

The speed of the aircraft can be sensed from a central point, or driven from the aircraft speed sensor, such that the power to all navigation lights is interrupted for a period exceeding a few seconds to assure that all tip tracking beams are reset by the controller to an off-mode. Preferably an additional watchdog circuit is incorporated within each controller circuit to monitor the conditions and output of the principle controller and to shut down the units principle controller, laser beam, and motor if the principle controller attempts to operate erroneously.

The airspeed pressure sensing switch described above is preferably incorporated within a tip tracking system module to assure that unit operation is terminated at speed, while the timer further operates to cut off circuit power.

3. Installing Tip Tracking System with Existing Navigation Lighting.

To provide a tip tracking system that may be readily mounted on different aircraft, the unit may be configured as a small module having either a patterned and/or nutating illumination source and control circuitry. The module may then be installed to existing lighting systems or to the airframe. It is preferable that the number of adapters be minimized wherein the units may be readily installed on any aircraft having a lighting system.

3.1 Light Slice Configuration.

Figure 10:
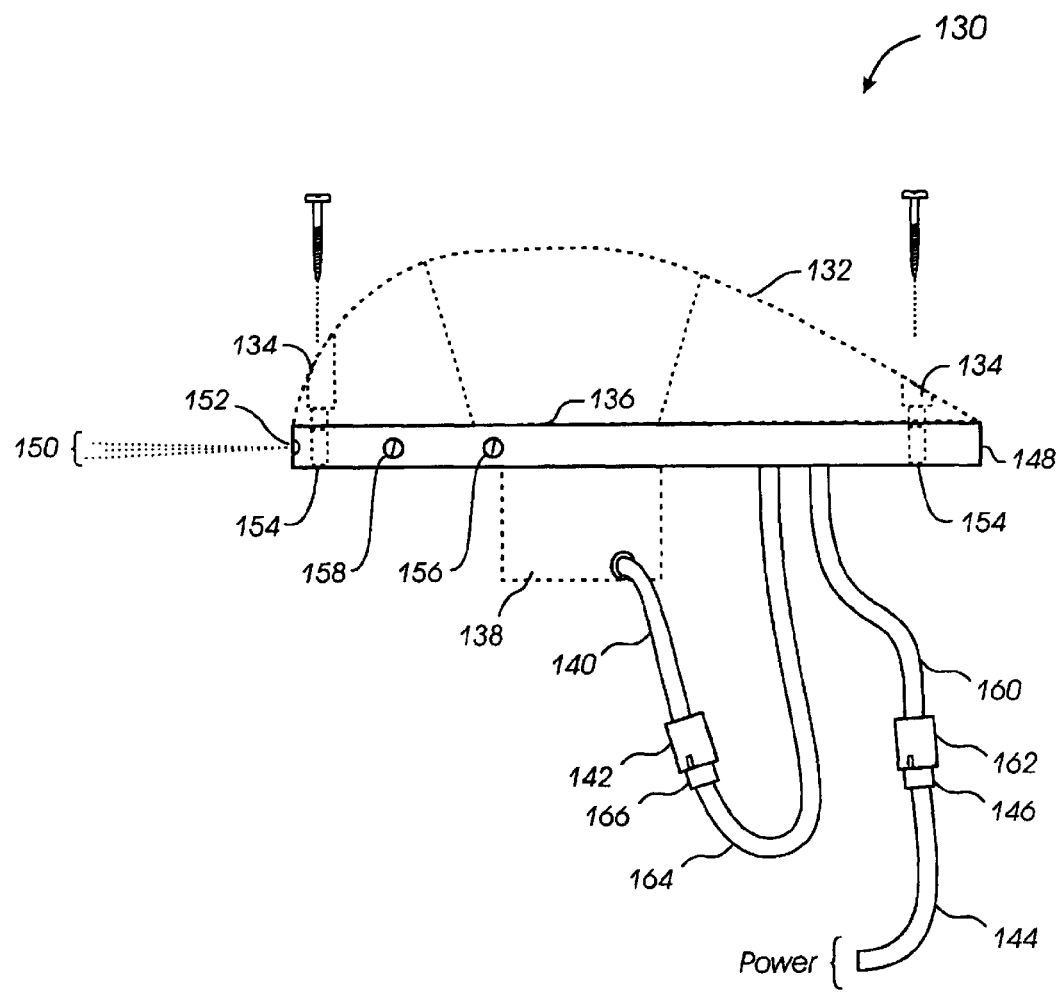
FIG. 10 is a side view of a light element for a tip tracking system which is configured for mounting in combination with a conventional navigation or strobe light.

FIG. 10 exemplifies one preferred modular installation 130 of a navigation light system that may be referred to as a "light slice configuration" in reference to how it appears as a slice cut from the extended housing of the navigation light assembly. The light slice module comprises a tip tracking system light projection element 148. To minimize cost and installation difficulty the tip tracking system may be combined to mount in association with a conventional navigation light 132 (shown in phantom). The conventional navigation light 132 is configured as a transparent lens having mounting holes 134 and an inner surface 136 which is retained against the wingtip of the aircraft, or now in this case the light projection element. Typically, an inwardly extended portion 138 of the original navigation/strobe lighting extends into a cutout in the wingtip. Wiring 140 exits the navigation light unit and terminates in connector 142 which is configured for connection to a navigation light power cable 144 configured with connector 146.

Light projection element 148 is shown containing the light pattern projection source and electronics, and requiring only a source of power for operation. It should be appreciated that the system may be implemented by simply installing the "piggyback" style devices on either wingtip and optionally adjusting the units for proper alignment. No additional electronics, wiring, or other configuration needs be performed in order to complete the simple installation shown. The housing is configured to mount in combination with a navigation light unit, strobe light unit, or combination unit. The unit is configured to emit a patterned beam 150 from a light pattern light source 152. The housing for the tip tracker is configured with similar mounting configuration, such as holes 154, to mount in combination with the conventional light assembly 132.

It will be appreciated that few vendors exist (i.e. Whelen®) for the navigation lighting systems and therefore mounting patterns are generally standardized. The direction of the emitted light pattern can be preferably adjusted through a predetermined range by a horizontal adjustment 156 which changes the forward angle in relation to the direction of travel, while vertical adjust 158 is used for altering the vertical projected pattern so that it is projected horizontally in front of the aircraft when it is configured for taxiing.

During installation of the tip tracking system, cable 144 and connector 146 for navigation light power has been reconnected to the tip tracking module through a cable 160 with connector 162. The tip tracking module thereby receives operating power and signals and routes power to the conventional navigation light through cable 164 having connector 166 which is interfaced to connector 142 of the navigation light unit. It should be readily appreciated that the tip tracking unit may be integrated into the design of a combination tip tracker/navigation light, or one that alternatively, or additionally comprises a strobe light unit.

4. Projecting Single Pattern from each Wingtip

Figure 11:
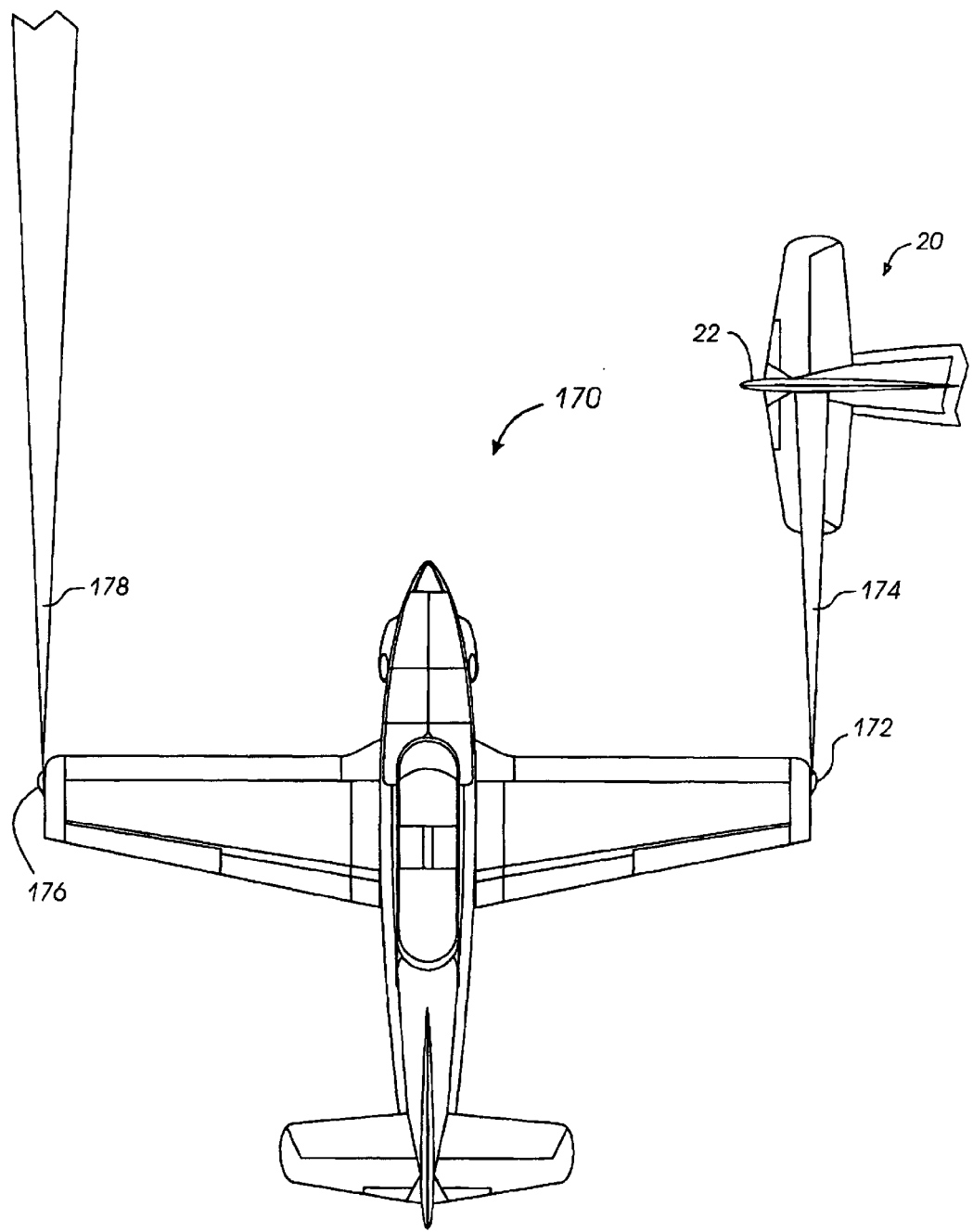
FIG. 11 is a plan view of an aircraft to which the tip tracking units of FIG. 10 have been mounted according to an embodiment of the present invention.

FIG. 11 illustrates an aircraft 170 with tip tracker units 172, 176, installed which are similar to that of FIG. 10. Tip tracker unit 172 projects illumination pattern 174 and tip tracker unit 176 projects illumination pattern 178. As these tip tracker units are shown mounted within approximately one to two inches of the extreme tip exterior they are capable of registering a possible collision at closer ranges than projection unit mounted further inboard, such as shown in FIG. 1. It will be appreciated that the tip tracking system may be employed without the central dual beam distance correlation unit for providing accurate distance marking beams which intersect the beams from the forward facing wingtip beam units. Aircraft 170 is shown having a simplified installation of the tip tracker system which utilizes light projection units on only the outboard wingtips of the aircraft without the use of a distance correlation unit.

The preceding descriptions of tip tracking systems utilize a general method of detection wherein a source of illumination is generated; patterned into a shape that conveys position and distance while being easily discerned from background illumination; and the projecting of the patterned illumination in the direction of travel at the extremity of the aircraft object, such as wingtip, that is subject to encountering obstructions.

The pattern of the light source may be created by numerous methods such as by using masks, or preferably by varying the direction of illumination projection. As continuous operation of the tip tracking system could be distracting to other pilots and airport personnel, the tip tracking system is preferably configured for activation upon receipt of an activation signal, whereupon it operates thereafter for only a brief time period. The power activation circuit detects the signal and engages the illumination sources by supplying them with power which is converted to light energy. The tip tracking system may be deactivated manually, and is preferably subject to a timed deactivation, or optionally an airspeed driven deactivation to reduce the unwarranted projection of light. A number of activation and control mechanisms for use with the tip tracking system are described later in the application.

5. Selecting and/or Modulating Illumination Patterns.

A number of benefits can be derived by providing illumination patterns that span different angular spreads, such as between 5° and 20°. For example, changing the angular spread is particularly useful when traversing corners, as a close-up narrow pattern would miss an obstruction that may be struck, such as with the right wing when turning right. The pattern angle may be modulated automatically, such as changing nutation diameter periodically, wherein the pilot gets distance feedback for a range of situations without the need to adjust the illumination angle manually. The pattern angle may be modulated automatically in response to other sensed conditions, such as the rate of turn, wherein the tighter the turn the larger the angular spread generated to compensate for turning angle. The pattern angle may also be set manually, such as by having the pilot select the angle necessary for a given situation.

5.1 Automatic Modulation of Pattern Spread.

If the tip tracking system includes "means for directing the patterned illumination", then this may be operably coupled to a controller to execute angular spread changes. Alternatively, the means for directing the patterned illumination may be configured for executing a pattern automatically, such as using mechanical means such as cams, or other forms of pattern changes.

Considering the case of changing the pattern spread by changing the nutation angle upon which one or beams are angularly spread. Automatic cone angle changes may be created by configuring the nutation mechanism to transition through a set of fixed patterns, such as angular spread. For example, the aperture of the cone may be varied through multiple angles, (i.e. two, three, or more angles), wherein the circular pattern is displayed in multiple sizes. The wider apertures allow detection of objects farther off line horizontally which may become a problem during a turn in that direction, while the narrower patterns provide more precise information. An output from the controller can be coupled to an electromechanical rotating drive to alter the diameter of rotation. It will be appreciated that multiple circles may be simultaneously generated using optical elements such as splitters. As with any of the features described herein, this aspect of the invention may be utilized with any embodiments of the invention described herein or prior applications.

5.2 Manual Control of Pattern Spread in New Installations.

It should be appreciated that in new installations it is relatively easy to wire in an additional control, such as a potentiometer, or preferably multi-position switch, for setting the angle of pattern spread. The separate control may include an "intensity" control or other scalable input device that would normally be provided along with a set of wiring connected to the laser tip tracking lights. The single control input would preferably control both the activation and the angular spread of the illumination pattern.

5.3 Manual Control of Pattern Spread for Existing Installations.

If a scalable pattern spread is desired for an existing installations, then it is preferably that a signal be communicated to a circuit within the tip tracker control unit. This may be readily accomplished by transmitting a signal over the wires running to the NAV light from an input selector, such as a lighting control switch. The tip tracker control circuit extracts the signal from the line and sets the angular spread accordingly.

To provide a simple pattern spread control between one or two different settings, additional power transitioning, or signal injection, may be performed on the power line and sensed by the tip tracking system. By way of example, angular spread may be selected by: (1) sensing extra power transitions of the NAV switch to select spread, (2) time delays between transitions, (3) the transitions of strobe light power, or other equipment, can be sensed as a control input.

Alternatively a signal for controlling angular spread may be communicated to a remote light unit using a cockpit control connected an RF transmitter that communicates the information to a circuit proximal to the pattern illumination source which is mounted near the wingtip. The use of a remote control mechanism would preferably provide for control of both activation and pattern spread whenever power was provided by the navigation lights, strobes, or other power source available near the tip to which the circuitry of the tip tracking system is connected.

6. Non-Laser Pattern Projection

Figure 12:
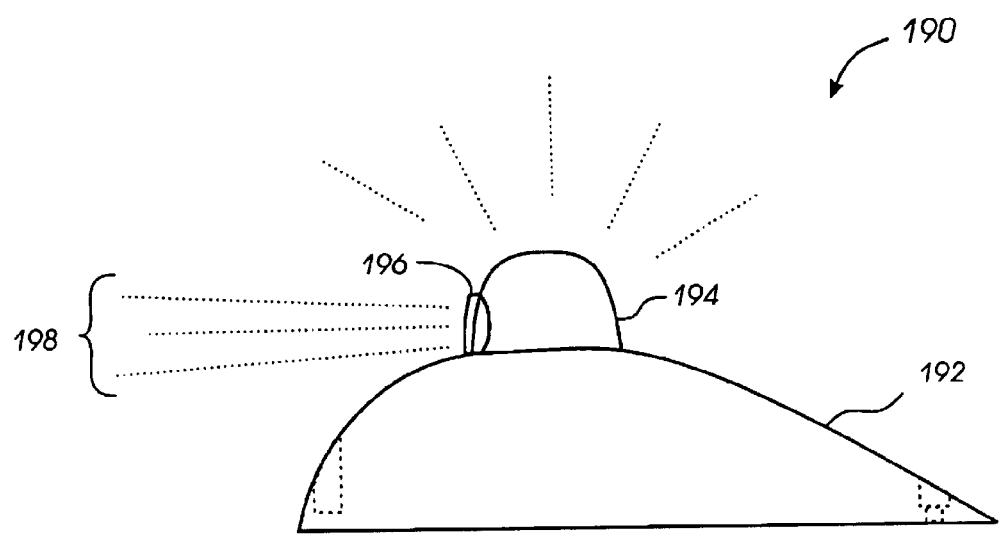
FIG. 12 is a side view of a light element upon which a light patterning device have been attached according to an aspect of the present invention.
Figure 13:
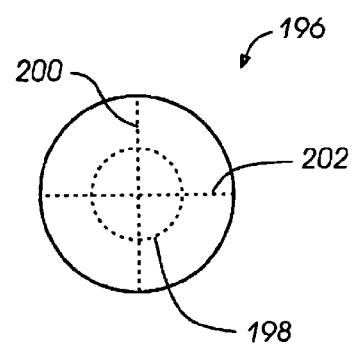
FIG. 13 is a facing view of the light patterning device of FIG. 12 configured for mounting to a strobe or navigation light according to an aspect of the present invention.

It will be appreciated that wide variations in circuit implementation may be provided for without departing from the teachings of the present invention. A less preferred version is shown in FIG. 12 and FIG. 13 which utilizes the light power of the strobe to provide targeted illumination through a patterned lens, or graticule. A combination navigation light/strobe light 190 is shown in FIG. 12 with a navigation light 192 into which is integrated a strobe light 194. Tip tracking is achieved with the strobe light by affixing a light patterning device 196, such as lens containing a graticule or pattern, onto the forward exterior of the strobe light. FIG. 13 shows a view of a preferred pattern for the light patterning device 196 which is shown configured with a circular light obstructive pattern 198, a vertical line obstruction 200, and a horizontal lines obstruction 202.

A lens shaped device can be made for attachment to existing strobe lights, such as by utilizing optically clear adhesives, to provide the patterned light effect. It should be realized, however, that the resultant tip tracker may be subject to a number of drawbacks, such as loss of pattern definition, due to the non-point source nature of the illumination, and a limited range over which the pattern will be visible. Furthermore, since the strobe light is a white light, it may prove difficult to view the system during operation in daylight.

A light patterning device could be similarly created for use on the navigation lights, however, it will be appreciated that the light intensity of the navigation lights is far less than that of the strobes such that recognition of the pattern in a possible obstructive surface may be further reduced.

A separate patterned illumination source may be incorporated into the strobe system, such as a laser light (static pattern or nutating), which is activated in response to strobe power and fluctuations thereof. Furthermore, a patterned illumination source may be located in relation with a navigation light and yet be powered in response to strobe light activations. It will be appreciated that activating the tip tracking system from the strobe circuit may be desirable if the projected light is to be generated during flight operations to increase forward visibility. Strobes are not generally used on the ground, however, they may be activated in conjunction with the tip tracker patterned illumination or the tip tracker circuit pulsed for activating the tip tracker while leaving the strobes off.

7. Alternative Mechanical Installations

Figure 14:
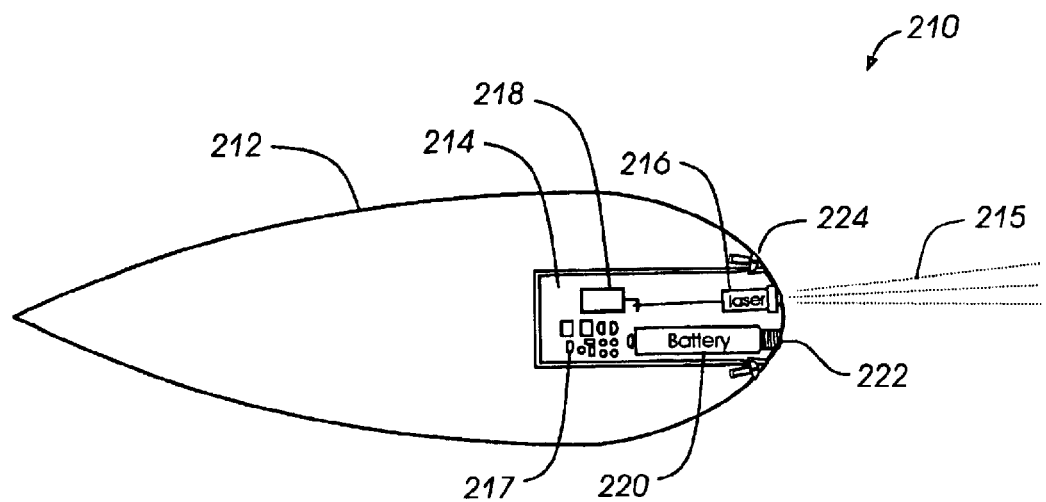
FIG. 14 is a side view of another embodiment of the tip tracking system according to the present invention, shown configured as a removable module for insertion within an adapter configured for use with a particular form of navigation lighting installation.
Figure 15:
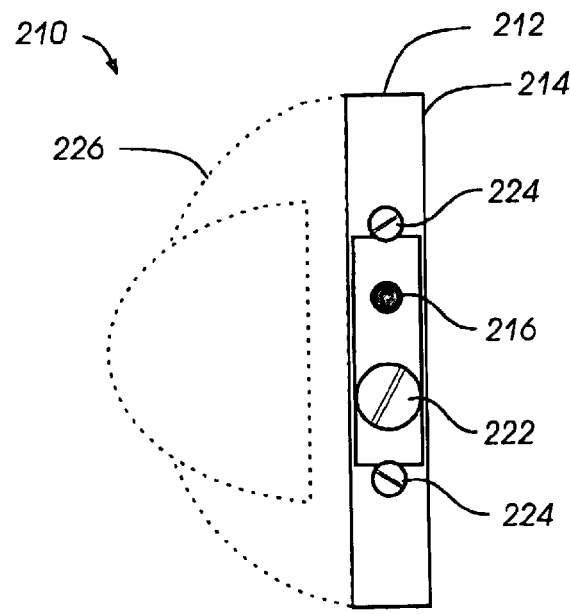
FIG. 15 is a facing view of the embodiment depicted in FIG. 14.

FIG. 14 and FIG. 15 depict a preferable aftermarket modular assemblage 210 of the unit that may be connected beneath conventional navigation, and nav/strobe lighting. This module is shown generally having a similar shape as that depicted in FIG. 10 with an adapter housing 212 that matches that of the navigation light assembly, however, it is configured with a replaceable module 214 containing a battery source (the electronics being described later). It should be appreciated that aspects of tip tracker embodiments may be mixed and matched to create a number of alternative embodiments, which are not described herein for the sake of brevity.

The modular unit 210 is shown in a side view and an end view. A patterned projection source and control module 214 is preferably mounted on a single base (i.e. printed circuit board). Projected patterned illumination 215 is shown being emitted from a patterned illumination source 216 preferably a laser module. Control circuits 217 are shown within module 214 for driving the patterned illumination source 216 and an optional actuator 218, preferably comprising a motor whose output is mechanically coupled to the illumination source 216 for imparting a nutation thereto.

Illumination source (laser) 216 is shown with a positioner controlled by actuator 218, such as a pager motor which is activated to nutate the beam. The diameter of nutation may be controlled roughly by biasing the control shaft exiting the rear of the laser toward the center of rotation of the offset coupling to the motor shaft; wherein as the RPM of the motor are increased the centrifugal force operating on the weight of the shaft overcomes the bias force to extend the angle of nutation. The controller therefore may control the angle by pulse width modulating the output signal to the motor, wherein motor speed is then dependent on duty cycle. Alternatively a stepping motor may be utilized wherein the controller is able to directly and accurately control the speed of rotation. Any convenient method may be chosen for modulating the exit beam angle so as to follow a desired pattern.

Battery power 220 is shown retained within module 214 by a cap 222 allowing ready replacement of the battery. Preferably a self test mode is entered upon powering up the tip tracking system wherein the battery condition is communicated to the pilot, such as by temporarily modulating the light intensity being output, or varying the pattern generated, in response to the measured battery condition so that the user can replace the power source in a timely manner.

The light and control module 214 may then be fitted within a selected adapter mount 212 (the teardrop shaped item illustrated) which adapts the module to a variety of different aircraft and mounting installations. Module 214 is shown retained by retention screws 224, which hold the module securely let allow it to be removed for repair or replacement. Using a small replaceable module, allows the tip tracking system to be readily configured for use on different aircraft, by providing different forms of simple adapters 212, instead of having to create a different tip tracker housing for each installation. It will be appreciated that the front surface of the light module is preferably configured in the same shape for use in all adapters.

8. Integrating Patterned Illumination Source within Bulb or Similar Element.

One elegant method of incorporating the tip tracking system within an aircraft is to provide a module that replaces existing navigation bulbs (or less preferably strobe lights or other elements). This approach has a number of benefits, including that the tip tracking system may be installed by anyone qualified to replace the bulbs, and no modifications to the aircraft or lighting systems is necessary. The tip tracker module which replaces the traditional bulb element unit, is configured to generate the conventional navigation illumination (or strobes, etc.), and additionally to generate the patterned illumination projecting a distance from the front of the wing.

This module may be referred to as a "tip tracker bulb module", and it preferably contains both a bulb (or solid state equivalent) along with control electronics and a laser configured to generate the desired illumination pattern directed horizontally forward of the wing. It is preferred that the bulb and laser element be detachable from the module to simplify field replacement.

For simplicity the laser element described within this embodiment may utilize a patterned lens element to generate a conical pattern emitting horizontally from the tip of the wing, instead of a nutating electromechanical arrangement. It should be appreciated, however, that a nutating beam, such as driven electromechanically, or using muscle wire actuators, MEMs mirrors, and so forth may be alternatively implemented despite its slightly higher complexity.

It will be noted that only a small number of styles of navigation lighting bulbs exist. The more typical units have a large bayonet mounted base (approximately 0.5 inch diameter) and a bulb of approximately one inch diameter or more. Many of the large bulbs utilized have a reflective coating on a portion of their interior to direct the lighting to the forward quadrant from the wing (so the lighting is seen from the front and side but not from the rear. The large size of these typical bulbs makes them a good candidate for being replaced by a hybrid lighting unit which includes a tip tracking system.

The tip tracking bulb module provides a bulb shaped housing which is manufactured with the correct mounting base, such as bayonet, yet the evacuated bulb portion is replaced with drive circuits, a patterned illumination source (typically a laser), and a small light emitter comparable to the original bulb. The small light emitter may comprise a smaller bulb (many of which are available, i.e. halogen) configured for mounting within a socket or other connector within the form factor of the original bulb. The small light emitter is typically a small incandescent bulb, which may be tungsten, halogen, or any other approved form of light element.

It will be appreciated that as nanostructured forms of incandescent bulbs become available they will be more preferable than using conventional wire filament bulbs in that they generate comparable light approximately 5–15 times more efficiently than conventional incandescent bulbs which lack the nanostructured filament element. Optionally, a reflector may be incorporated to match the characteristics of the original bulb.

As conventional incandescent navigation bulbs have a life expectancy of approximately 300 hours, they are subject to regular replacement. The replacement therefore of the lights with a module containing the tip tracking system is a simple process. In addition, since the light bulbs are radially asymmetrical, such as with a reflector for directing light in the forward quadrant, the mounting socket is already oriented in a fixed direction so that the tip tracking system should require little or no angular adjustments.

8.1 Embodiment of a Tip Tracker Bulb Module.

Figure 16:
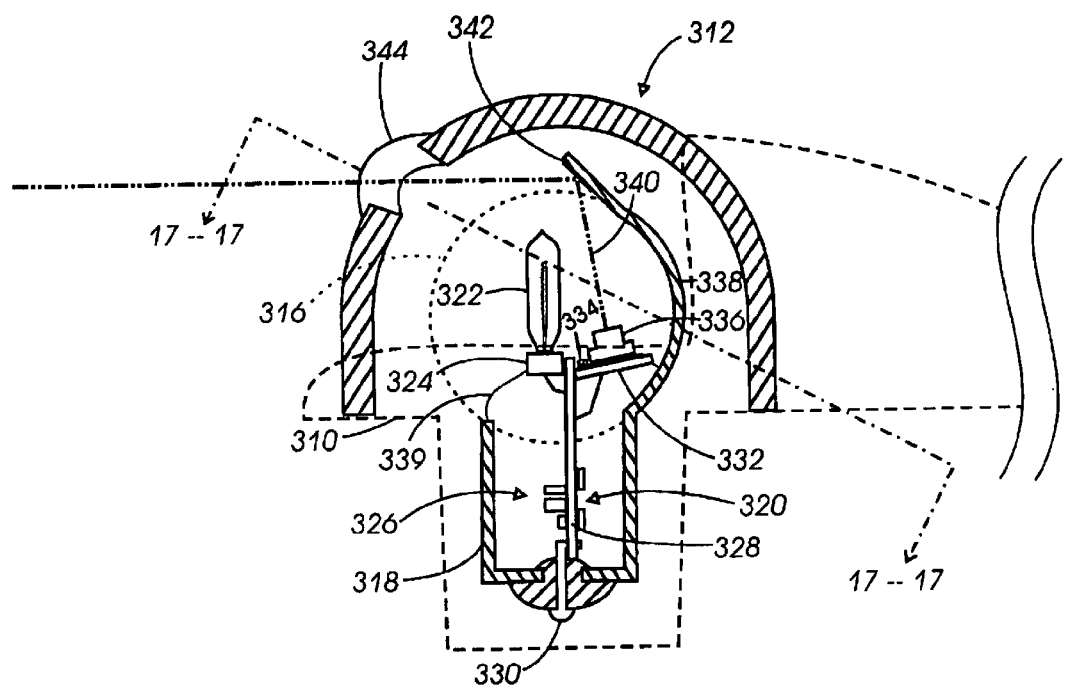
FIG. 16 is sectional side view of navigation bulb element into which a projective light source is integrated according to another embodiment of the present invention.
Figure 17:
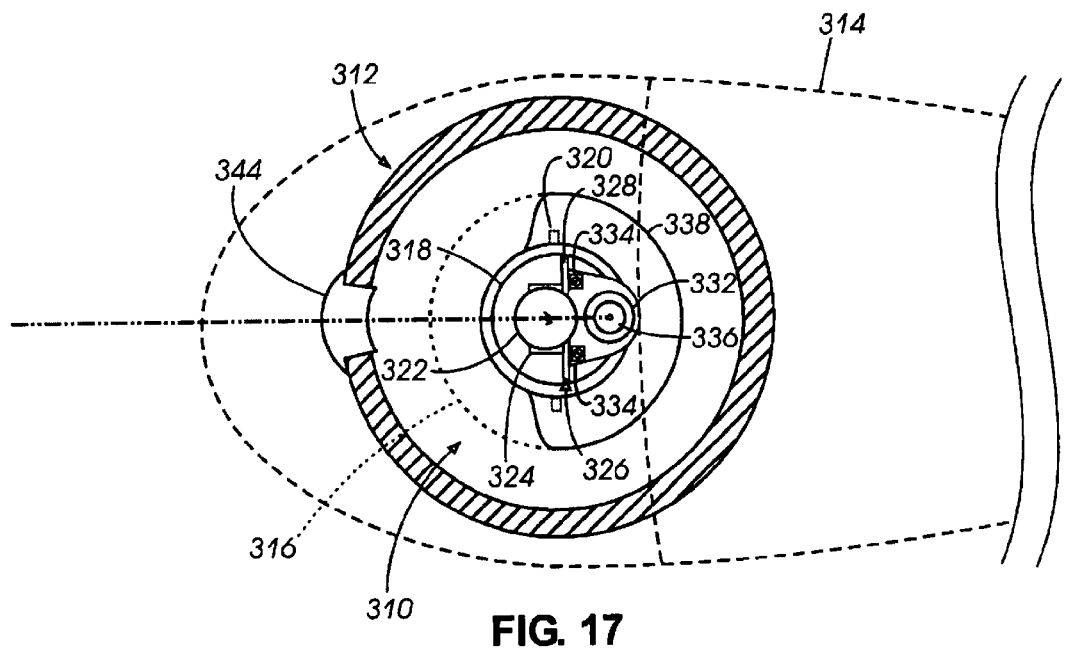
FIG. 17 is a sectional top view of the navigation bulb depicted in FIG. 16.

FIG. 16 and FIG. 17 depict a tip tracker bulb module 310 within a conventional spherical colored lens 312 mounted within a housing 314. The outline of a conventional navigation bulb 316 is shown in an outline, in connection with a conventional bayonet mounted base 318 with two extended pins 320 for retention within a slotted spring mounted light fixture (not shown). It will be appreciated that the present tip tracker lighting element follows the general contours of the bulb outline 316 and base 318, so that it may fit within any installation that will accept the bulb. Tip tracker bulb module 310 is shown adapted with a small conventional incandescent bulb 322 to provide navigation illumination. Conventional bulb 322 is shown preferably inserted within a socket 324, although it may be permanently mounted (permanent mounting is less preferable unless a solid state form of long life lighting element is utilized (i.e. LED).

A laser control and power circuit 326 is shown mounted within base 318. Preferably the circuits are mounted on a printed circuit board 328 that makes contact with the pin contact 330 and base 318. The small circuit board after testing is preferably installed within the base, soldered in place whereafter a non-conductive potting compound 339 is used to surround the circuit to provide environmental protection and mechanical stability.

A preferably replaceable laser module 332 is retained within module 310, such as by fasteners 334 which also provide electrical connectivity for this embodiment. A packaged laser diode 336, preferably with lens, is connected to module 332. The laser may be extended on a flexible post or stage wherein the output angle may be modulated in two axis. Laser module 332 is preferable secured into conductive retention apertures connected to the printed circuit board 328 and mechanically secured therein so as to be aligned with the top of the potting compound (which may be ground to fine positional tolerances).

A reflector 338 is shown surrounding a portion of the tip tracker bulb module 310 following the contour of a conventional bulb 316. A tracking beam 340 is shown being emitted by laser diode 336 toward a mirror surface 342 (top portion including mirror is not shown in FIG. 17 for clarity of the underlying elements), wherein it is reflected forward of the wing to "paint" targets in front of the wing to prevent collisions. The position of the mirror may be adjusted slightly to direct the beam in a horizontal line in front of the wing.

The laser beam is capable of penetrating colored lens 312 (red or green), although a certain amount of beam attenuation arises. Therefore, an optional clear lens 344 is shown fitted into lens 312. The lens may be configured with the small clear portion, or the large navigation bulb lens may be adapted for use with the laser beam output. For example, after mounting and aligning the laser, the lens may be trial fitted and marked with the location through which the laser passes. A hole is then drilled of a predetermined diameter at that location. The clear lens element 344 is then inserted and glued (such as with polycarbonate cement, or cyanoacrylic adhesive) to the colored lens 312.

It will be appreciated that a red laser can be transmitted through a red lens with less attenuation than when being transmitted through a green lens. Alternatively a laser fabricated for emitting green laser light may be utilized with the green lens. Due to the more complex fabrication the current prices of green lasers are about an order of magnitude higher than for a red laser, however, the costs are expected to drop as the manufacturing processes mature. Although a mirror 342 is shown as part of reflector 338, other embodiments may be provided which direct the laser light by other means.

Figure 18:
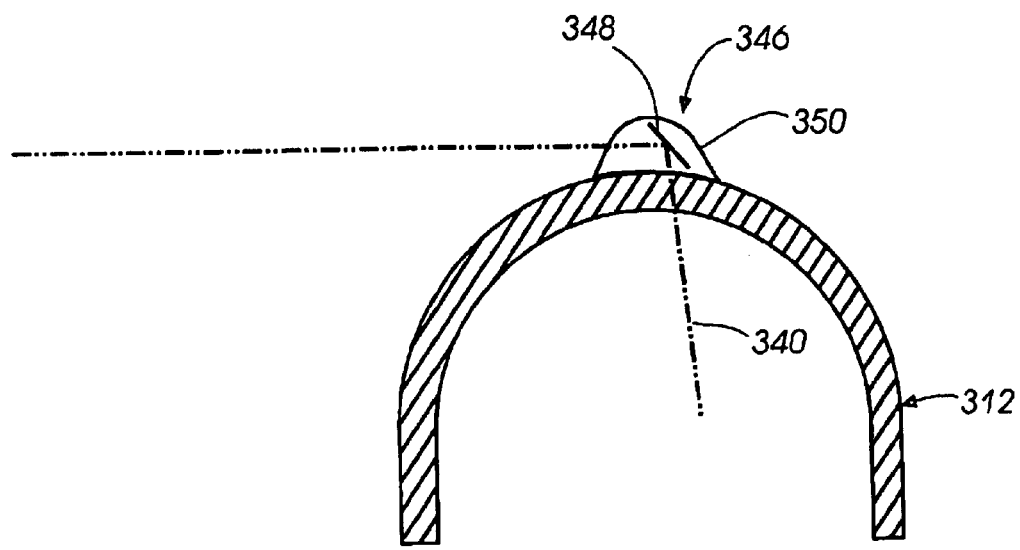
FIG. 18 is a sectional side view of a lens housing fitted with reflectorized lens according to an aspect of the present invention.

FIG. 18 depicts a combination mirror reflector and lens 346 attached to a colored lens 312, the tip tracker bulb and housing are not depicted. Mirror reflector 346 comprises a mirror 348 embedded within a clear (preferably solid) material 350. The unit may be attached over the tip of lens 312 in alignment with the laser, which has a uniform spherical tip portion. The uniform spherical tip of colored lens 312 simplifies moving the angle and forward and backward orientation of mirror reflector and lens 346 with embedded mirror 348 therein, to properly direct the laser beam for the proper forward direction during taxi operation.

Navigation lens assemblies may be fabricated with an aperture at the tip for receiving the reflector assembly. The vertical angle may then be adjusted for a taxi attitude while the horizontal angle may be adjusted using a set screw, or other adjustment mechanism, within the mirror assembly. In this way the units may be readily fitted to navigation elements and adjusted for the particular angular relationships for the given aircraft.

Figure 19:
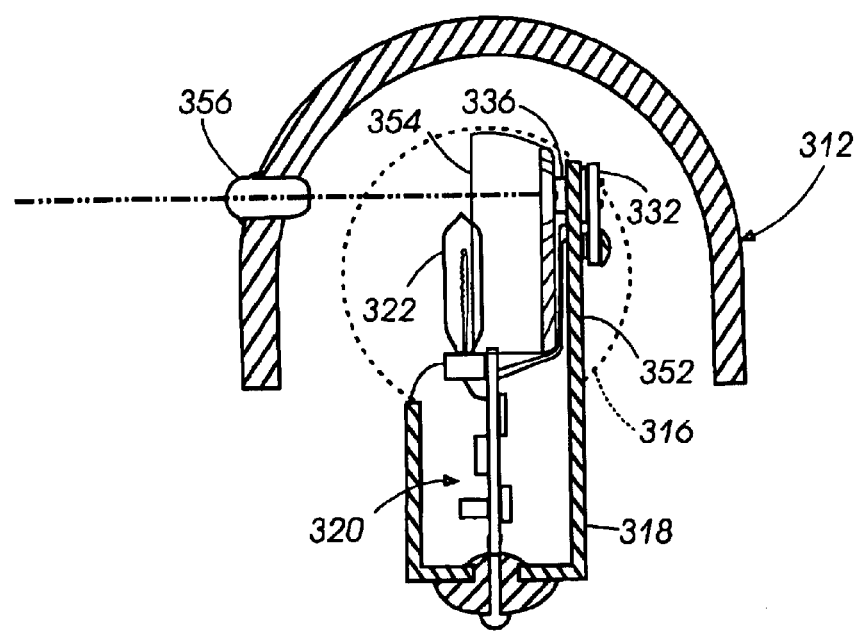
FIG. 19 is a sectional side view of a pattern projection element oriented for direct projection within the bulb housing according to another embodiment of the present invention.

FIG. 19 depicts direct mounting of the laser element without a mirror assembly. This embodiment eliminates the need of a reflector assembly and directly orients the laser through a portion of the navigation lens forward of the wing so that obstructions are "painted" by the tip tracker. An elevated member 352 is utilized to extend the height of laser element 336 above the height of light source 322. This embodiment shows a portion of the cylindrical base extending upward and upon which a laser module 332 is attached to contacts extending down to the circuitry. The positioning of the laser light may be altered by simply bending the metallic member supporting laser element 336, until proper forward alignment is achieved. An optional section of curved mirror reflector 354 provides redirecting a portion of the light from bulb 322 and is adapted with an aperture through which the laser light is directed. The reflector may be alternatively incorporated within the upwardly extending member 352, implemented with other structures, or left off entirely.

An optional form of cylindrical lens is shown 356 in phantom, it will be appreciated that such a lens takes up little room and does not alter the beam pattern. Furthermore, the direct illumination embodiment shown should suffer from slightly less attenuation due to the direct nature of the laser light output.

Figure 20:
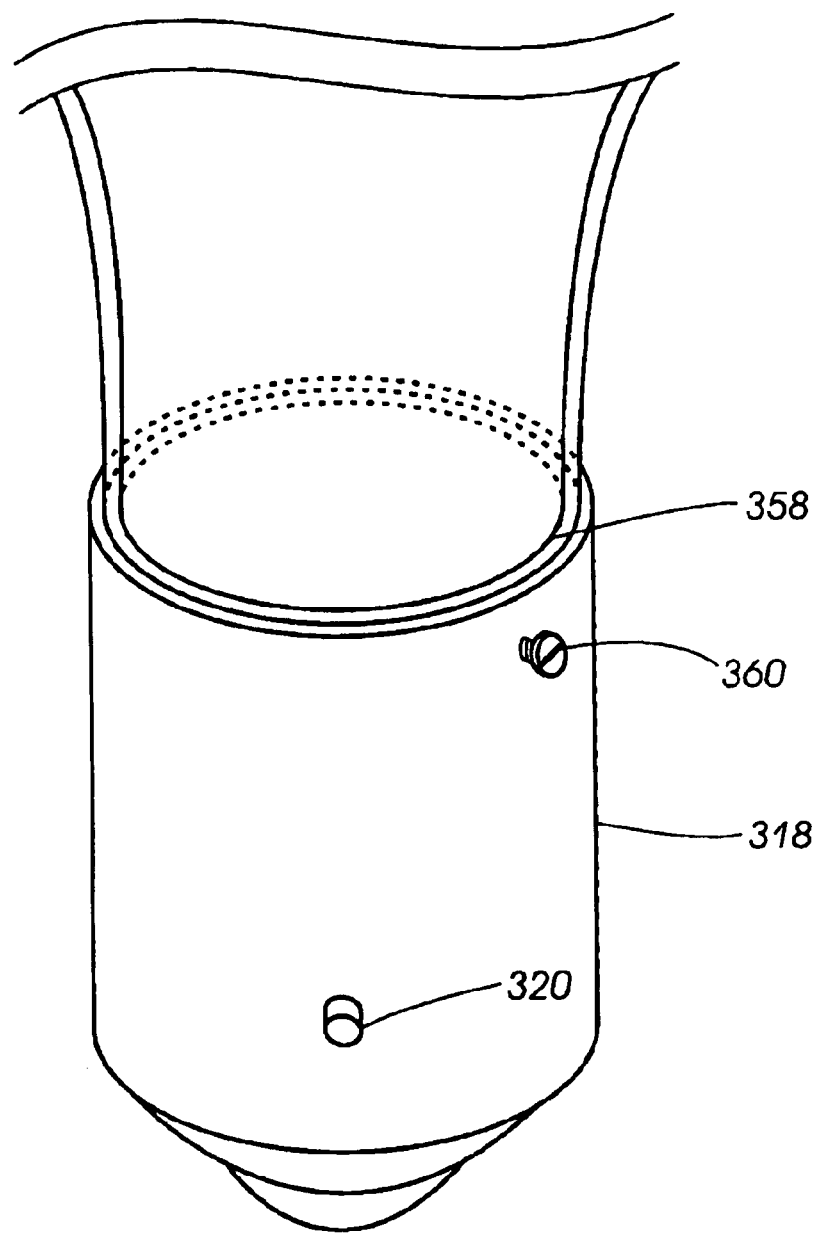
FIG. 20 is a detailed view of a positioning adjustment mechanism according to an aspect of the present invention.

FIG. 20 depicts a mechanism for adjusting the direction that the patterned illumination source is being directed. It will be appreciated that in some instances the bulb mounting, such as bayonet 320, may not properly direct the illumination in the optimum path forward of the wings. Therefore, it may be desirable to provide an adjustment to the direction in at least one axis. This figure depicts an inner housing 358 that is slidably engaged within an outer housing 318 and retained in a selected position by a fastener 360 such as a set screw. One of ordinary skill in the art will readily recognize that mechanical or optical means may be utilized for providing user adjustment in any desired axis of motion.

9. Intercepting Power for Tip Tracker.

Intercepting the navigation light power (or other tip directed signal such as strobes) may be performed within the socket of the navigation light so that the tip tracking system may be installed without the need to remove the entire navigation light assembly to access the power cable attached therefrom.

By way of example, a thin circular shaped disk may be attached to the base of the light bulb which routes the power to a separate circuit and the laser element mounted nearby. The disk is preferably approximately equal to or less than 1 mm thick so that insertion pressure of the bulb within its spring-base socket is not unduly increased.

Figure 21:
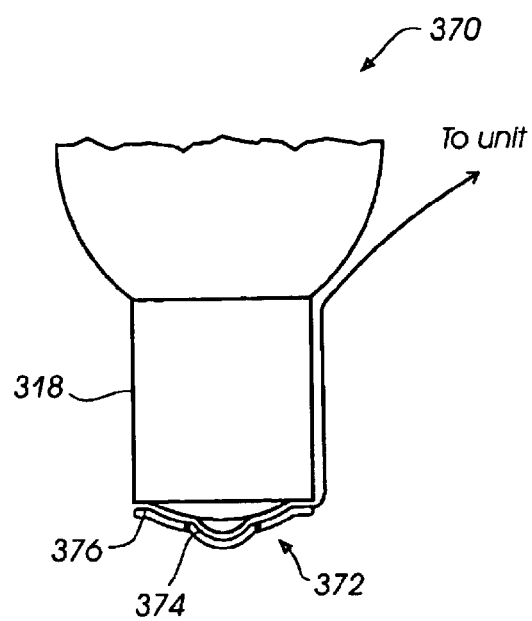
FIG. 21 is a side view of a power takeoff element according to an aspect of the present invention shown for deriving power for the tip tracking unit from a fixture into which a conventional lighting element would be retained.

FIG. 21 depicts a power takeoff 370 comprising a circular shaped disk 372 with tip contact and base contact 374. Power takeoff 370 is preferably attached, such as by soldering, to the base of the lamp for accessing the power and ground signals therein, so that the navigation light assembly need not be removed from the aircraft for connecting to power and ground.

By way of further example, a bulb may be fabricated which routes signals to a remote laser unit. The electronics may be located within the base of the lamp or in the external controls.

10. Directing the Patterned Illumination Utilizing Optical Pipes.

The laser light may be redirected along the desired horizontal forward path using a light pipe with a terminal lens.

Figure 22:
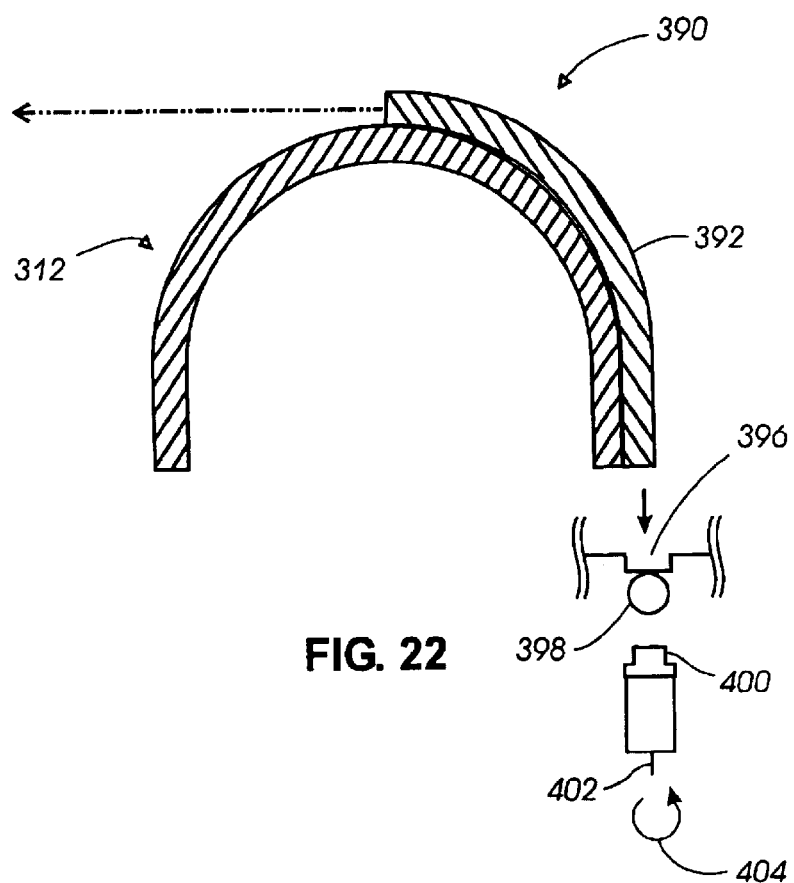
FIG. 22 is a sectional view of a light pipe being utilized for redirecting projective illumination according to an aspect of the present invention.

FIG. 22 depicts a light pipe embodiment 390 shown in cross section. A lens 312 is adapted with an attached light pipe (may be fabricated with it or it may be attached thereupon). The light pipe terminates in a coupling 394 adapted for connecting with a mating element 396 of the light source. A bead lens 398 is shown in this embodiment for coupling the optical energy from the laser source 400 to optic pipe 392. The end of the laser tube is shown with an extension 402 to which rotation is applied 404, such as by a motor or similar electromechanical device to nutate the beam of the laser while it is still directed toward the front of the wing. It will be appreciated that the laser module may be inserted within the wing parallel to the wingspan which simplifies mounting.

11. Directing the Patterned Illumination Utilizing Moving Mirror Assemblies.

The use of a mirror assembly can simplify the positioning of the laser so that it may be located more conveniently. Furthermore, the use of a mirror at the extreme tip of the wing allows more precise forward and lateral clearance to be determined.

The mirror may be configured in a number of ways, such as (a) simple reflective mirror; (b) motor driven rotating mirror with curving surface to nutate reflections; (c) MEMs mirror array which is electrically driven with all elements in parallel (same angular offset) which subscribes a circle for nutation, or other patterns to generate different patterns of light.

Figure 23:
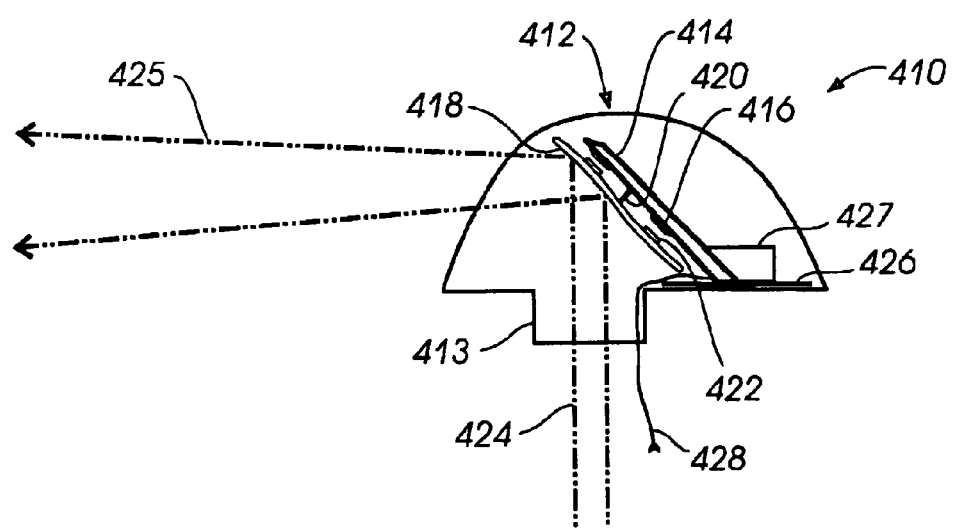
FIG. 23 is a side view of a reflective member for redirecting the angle of the projective illumination source according to an aspect of the present invention.

FIG. 23 depicts a motorized tip mirror assembly 410 (a stationary mirror has already been depicted). A housing 412 is configured for attachment to the navigation light lens, (or other tip mounted structure such as strobes). The mirror assembly may be integrated with the lens or configured for attachment to an existing lens. The housing is shown configured with a cylindrical alignment portion 413 that is configured for inserting within a hole drilled in the lens at a location to align with the exit path of the laser beam through the lens. It will be appreciated that the housing may be mounted, such as adhesively, to the exterior of the lens, however, the laser light is then subject to attenuation as it passes through the colored lens for reflection from the mirror assembly.

A mounting plate 414 which may be implemented as a circuit board is shown with coils 416 mounted thereon. A mirror 418 is attached at pivot 420 to mounting plate 414. Magnets 422 are attached at the rear of mirror 418 for inducing movement within mirror 418 about pivot 420 in response to the sequential energizing of coils 416 following substantially conventional principles of electric motors.

The surface of mirror 418 is adapted with curving surfaces that are adapted to reflect the impinging light 424 in a nutating pattern that follows a conical section 425 extending from the mirror. The shape of the mirror may be easily determined using optical CAD software using parameters for the desired amount of beam spread.

Power for this "motorized mirror" may be provided from an optical power cell 426 which converts light incident upon itself to operate a control circuit 427 which provides the intermittent power to the coils of the motor. It will be appreciated that external power 428 may be routed to the motor unit through wiring, which may be exceedingly small, even using transparent traces within a flexible circuit so that they are nearly invisible within the interior of the lens to which the mirror assembly 410 is attached.

If the mirror can be made to pivot sufficiently frictionfree, then the radiation heating may be used to drive mirror rotation. These effects are commonly seen in sealed units for demonstrating "solar winds", and for heat engines.

12. Integration within Aircraft Lighting Systems.

It should be readily apparent that it is generally easier to integrate the tip tracking system within new aircraft lighting systems as the number of design constraints is reduced. The above described methods of mounting the tip tracking circuits and illumination source are all applicable to that for new installations. In addition, the illumination source and circuit may be built into the lighting module for generating illumination which is emitted at any desired location within the lighting unit. These integrated lighting systems may incorporate the patterned illumination sources at different locations within the housing and be constructed with a number of variations without departing from the teachings herein.

13. Controlling Activation of Tip Tracking System.

The tip tracking system is typically only needed during brief periods of time when a pilot is taxiing near obstacles, such as planes, fences, vehicles, and so forth which incurse upon the taxiway. It is preferable therefore that the lights within the tip tracking system only be activated when needed and that they be turned off soon thereafter. It should be appreciated though, that the operation of the units during all or a portion of flight operation phases may provide beneficial long range directed lighting, wherein aircraft along the flight path of the aircraft can more readily see the patterned illumination from the laser source than from a conventional light source—which increases distance recognition. There is little chance for the laser to pose an optical nuisance problem as the light is diffused over the large separation distances. In flight lighting is particularly beneficial if color appropriate red and green laser lighting is projected forward of the aircraft.

If it is desirable, (i.e. FAA requirement or preference), then the operator should be able to control the activity of the patterned light source, which would preferably shut down after a predetermined amount of time or in response to a given set of conditions, such as airspeed beyond a given limit. However, the existing power systems on many aircraft do not make provisions for such a lighting system. For example, older systems may provide a single power control for both strobes and NAV lights. The following describes a number of activation methods and circuits for the tip tracker system. The following activation methods apply to any form of navigation/strobe light setup, however, a number of these are particularly well suited for use on systems that provide a single switch for navigation and strobe lights.

13.1 Activating Tip Tracking for a New Aircraft Installation.

For new installations in which additional wiring and switches may be easily provided, the tip tracking system is preferably installed with a controller within the cockpit having a user interface, such as activation control and optionally a beam pattern and/or spread control. The pilot can thereby command the control circuit as to how the tip tracking is to be operated. Furthermore, the tip tracking system may receive one or more of various status signals available in the aircraft. For example, a signal from the gear up switch may be communicated to the tip tracking system to automatically deactivate the tip tracker lasers. Furthermore, the tip tracker control circuit may receive signals from other cockpit controls, gauges, and sensors for controlling the activation and deactivation of the unit as well as the configuration of the tip tracking system.

The following describes techniques for controlling tip tracker operation which may be utilized in either new or retrofit installations. It should be appreciated, however, that for new installations the inclusion of additional wiring and controls is less difficult and may be preferred.

13.2 Activation at Time of Need.

Power to the tip tracking system may be coupled directly to navigation and/or strobe lighting wherein it activates when these lights are turned on. Preferably, the tip tracking circuit is adapted with a timing means to turn off tip tracking system lighting after a predetermined amount of time, such that the taxiway lighting of the tip tracking system does not remain active.

It will be appreciated that having active strobes during taxiing, especially at night is a source of annoyance for pilots taxiing other aircraft as well as ground personnel. It may be preferable, therefore, that the strobe lights not be activated during taxi operations. If a single control is provided for the navigation and strobe lights, then it may just be left in the off position (other than perhaps the landing light) until the pilot (user) encounters a prospective obstacle. Upon activation, the tip tracking system preferably operates for a short period of time (i.e. 3 minutes), which should provide sufficient time for the obstacle to be cleared.

13.3 Controlling Activation and Operating Interval.

It is generally preferred that the time of activation and operating interval be controllable within the present tip tracking system. Providing this level of control requires understanding the various forms of aircraft lighting installations.

Wingtip navigation and strobe lights on aircraft are installed using a wide variety of models of lighting sets, although few manufacturers produce the units. The control over the lighting varies, while variations exist in the manner in which the lighting is installed on the wingtips.

As an example of navigation/strobe light control, it should be noted that older aircraft may have a single switch for activating both navigation and strobe lighting, while some older aircraft did not provide strobe lighting. Modern aircraft typically have a split system for separately activating the navigation lighting and the strobe lighting.

As another installation example, some aircraft incorporate the strobe lighting on the front corner of each wingtip beneath a transparent cut out. Various locations for navigation lighting also exist. The conventional tip mounted lighting units may contain just a navigation light, or a navigation and strobe light. In some instances the lower base portion of the lighting unit is recessed into the tip of the wing.

13.3.1 Controller Selected Operating Duration.

Figure 24:
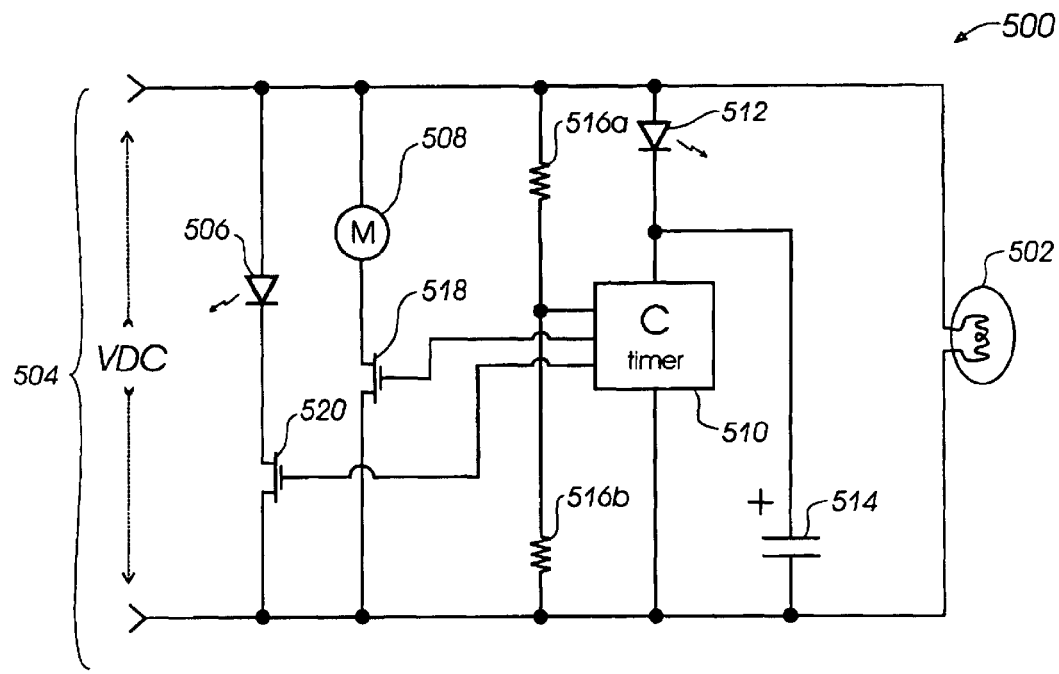
FIG. 24 is a schematic of a circuit which allows for operating the projected illumination source when the power has been interrupted, according to an aspect of the present invention.

FIG. 24 exemplifies a circuit 500 for activating a laser light and a motor for controlling the direction of the laser light, as in a nutating pattern, in response to the power applied to the navigation light. A navigation light element 502 is connected to a power line 504 to the tip, alternatively the ground may be formed by a chassis ground. A laser light element 506 for providing the horizontal forward illumination and an optional motor 508 for driving the pattern of laser 506, are shown for use with the tip tracking system control element 510. Power is provided to controller 510 through a diode 512 wherein operating power may be stored on capacitor 514, allowing controller 510 to continue to operate despite short power interruptions. The controller can sense the state of power 504 through a sense circuit herein depicted with a voltage divider 516a, 516b detected by controller 510. Outputs from the controller drive switching elements 518 and 520 for controlling the activation of the laser 506 and motor 508 respectively.

13.3.2 Pilot Control of Operating Duration.

It may be desirable to allow the pilot to control the duration of tip tracking system operation. This mode of operation may be implemented by operating the tip tracking illumination with stored power, which does not thereafter require a power source until the charge energy is depleted. A very high value capacitor (referred to generally as supercaps or dual layer capacitors) charge up for driving the laser illumination source. The supercap may be charged in response to a momentary power on the navigation and/or strobe circuit.

By way of example, by modulating power through the switch: flick power ON, (wait 2–3S) OFF, ON, (wait 2–3S) OFF. The capacitor charges during the ON cycles thereby providing sufficient energy to operate for a few minutes. The amount of time available for operation thereby depends on the amount of time the unit is charged in response to the ON states of the switch. It should be appreciated that no timer is required within this embodiment, just a rectifier into a capacitor whose power is available only when the power is off subsequent to a signal being received, such as provided by the described power cycling. It is preferred that the stored voltage be supplied to a voltage conversion power supply (step down and/or step down&up) (not shown) to provide efficient operation.

Figure 25:
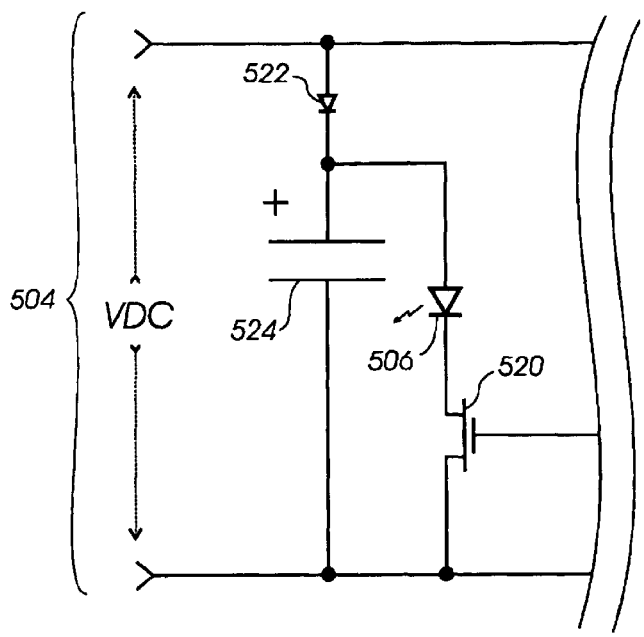
FIG. 25 is a schematic depicting another embodiment of the circuit shown in FIG. 24.

FIG. 25 depicts a charge storage solution, shown without the voltage conversion power supply (or V regulator), as an alternative front end to the circuit of FIG. 24. Charged through a diode 522 a super capacitor 524 can be utilized, or other electrical power storage means, for storing laser operating power. The controller then can activate the laser through switch 520 in response to the correct activation sequence, wherein the laser will continue operating until charge is depleted from the supercapacitor.

13.3.3 Powering Nav and Tip Tracker while Blocking Strobe Power.

On installations having a single power control for navigation lights and strobes, the strobe power may be blocked in response to the signals on the power wiring, such as switching transients following a predetermined pattern or superposing other signals.

The tip tracking unit may be powered from a combination navigation light/strobe circuit by incorporating a strobe light power control circuit.

By way of example the controller may be configured to response to power line transients for controlling the lighting. For instance, the laser comes on when nav/strobe power switch to set to ON. The tip tracking unit operates for a given (or user selectable) duration. Once deactivated can turn OFF and ON again for more time. Power to the strobe, however, is blocked unless power is cycled through an OFF-ON-OFF-ON pattern or other predetermined transient pattern within a short period of time. It should be appreciated that a number of mechanisms exist for communicating an activation signal to the tip tracking unit and a deactivation signal to the strobe light.

Figure 26:
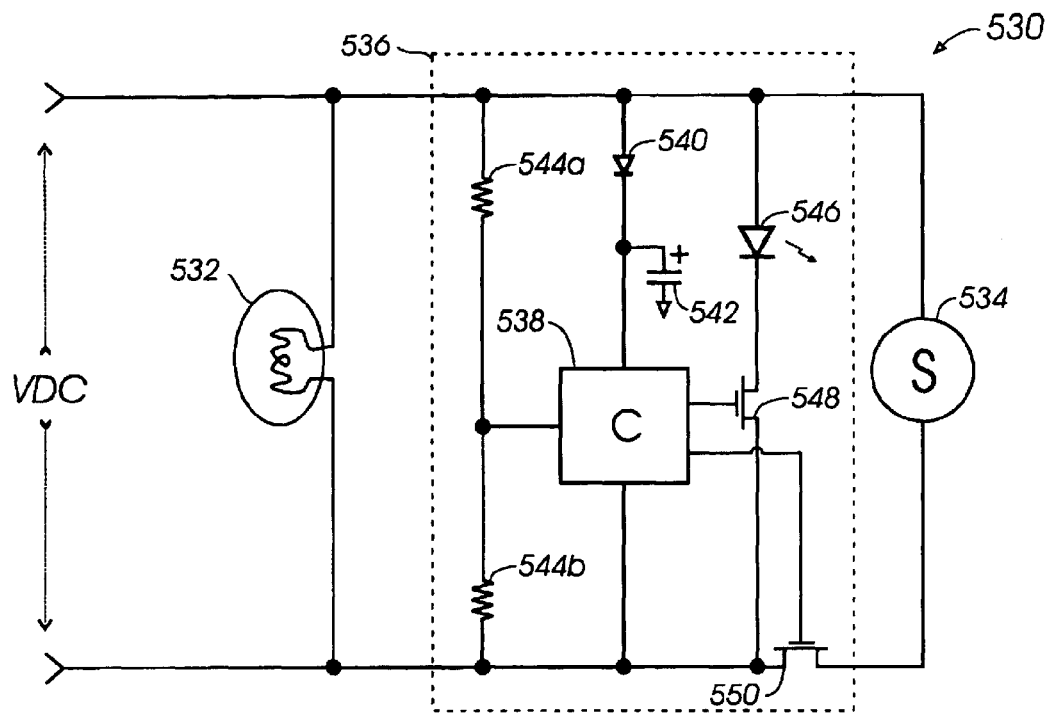
FIG. 26 is a schematic of a circuit which allows for controlling the activation of a strobe light that is connected to the same power connection as the navigation lights and the tip tracking system, according to another embodiment of the present invention.

FIG. 26 exemplifies a circuit 530 for controlling the activation of a strobe light and a laser tip tracking light. To prevent a strobe light from being activated in conjunction with a navigation light and in this instance a tip tracking light, the circuit operates to prevent strobe activation under given conditions. In this way the tip tracking light may be activated in association with the navigation light.

A navigation light 532 and a strobe light 534 are shown connecting to a power output across which a voltage is supplied. It should be appreciated that a strobe light typically comprises a strobe light element and a controller which generates high voltage pulses from a low voltage (14V or 28V) source, the combination being generally represented by the strobe unit 534.

A controller module 536 is shown connecting to the power source between the power source and strobe light 534. A control circuit 538 regulates the activation of strobe light 534 and the tip tracking functions. Power is supplied to control circuit 538 through a diode 540 charging capacitor 542, wherein power may be maintained for the controller despite power fluctuations or switching transitions of a switch through which the power is supplied. Control circuit 538 can sense the voltage being supplied through a voltage divider comprising resistor 544a, 544b, a center of which is connected to an input to the controller which is adapted to determine whether power is active or inactive. It will be appreciated that numerous mechanisms may be provided for determining the presence or absence of power across the source.

A solid state laser device 546 is exemplified in series with a switching element 548 whose activity is controlled by control circuit 538. The control circuit 538 can modulate the operation of laser 546 in response to the state or activity as sensed on the power supply. For example, the laser may be activated when the power is applied, in response to an ON-OFF-ON pattern, in response to reverse voltages, or controlled in response to other transitions or conditions that may be sensed on the power line.

Control circuit 538 also regulates the activation of strobe 534 through switch 550, wherein the strobe can be activated separately from the activation of the navigation lights and the tip tracking system. For example, strobe 534 may be activated in response to an OFF-ON sequence when the navigation lights have already been activated, or to an OFF-ON-OFF-ON pattern, or to any other desired signaling as sensed by the control circuit 538.

It should be appreciated that control circuit 538 may be provided separately from the present tip tracking system, as a separately claimed aspect of the invention, to allow aircraft navigation lights to be controlled separately from aircraft strobe systems. It will be noted, that a module containing control circuit 538 may be wired into the existing lighting system without needing to change the power control switch, wiring to the light units, or the light units themselves.

Ambient light detection is depicted as an ambient light sensor 552 connected to controller 538. This is an optional feature allowing the tip tracking system to modulate the intensity of laser light output, preferably according to pulse width modulation so that the laser light intensity being output will properly match the conditions. It will be appreciated that as it is more difficult to see a beam of illumination during daylight that the intensity of the laser source may be output at full power, whereas at night the intensity may be held at a much lower power output. It will be appreciated that the ambient light detector should be positioned so that it is not effected by the light generated by the aircraft. If shielded or separated mounting is not easily achieved, then other lighting should be temporarily disabled by the controller when ambient light measurements or detection threshold are checked.

It will be appreciated that a number of optical sensors may be utilized for detecting ambient lighting conditions, which may provide digital output, or analog output. One preferred method is to utilize a photocell to charge the gate capacitance of an input to controller 538, wherein the I/O line is set to output a ground to discharge the capacitance, and then the I/O line is put into a input mode and the time required for the input to reach the threshold voltage determines the ambient lighting.

It should also be appreciated that the laser diode element, or other optically sensitive circuit elements within the controller, may perform double duty wherein their characteristics are checked when off in response to ambient light intensity.

13.3.4 Powering/Activating Tip Tracker from Reverse Voltages.

Navigation lights, being generally incandescent, can generally be operated without regard to polarity. This ability may be utilized for signaling, or providing power for operating the tip tracking system.

By way of example, consider the following embodiment in which the navigation power switch is configured with a reverse voltage position. The single polarity navigation lighting power switch is swapped out with a two polarity ON-OFF-ON (reversed) switch. A normal ON position directs current at a first voltage to a given circuit, such as NAV, but that is not utilized by the tip tracking system for activation. A second ON position directs a low voltage of a polarity that is reversed from the first voltage. The tip tracker system then preferably operates from the second voltage and/or it may be triggered into an activation state by the second voltage, wherein it may operate from the first voltage when the switch is returned to that position. If other equipment could be harmed by the reverse voltage, or impose too much load, then a blocking diode may be placed in line with them to prevent reverse currents from flowing.

Figure 27:
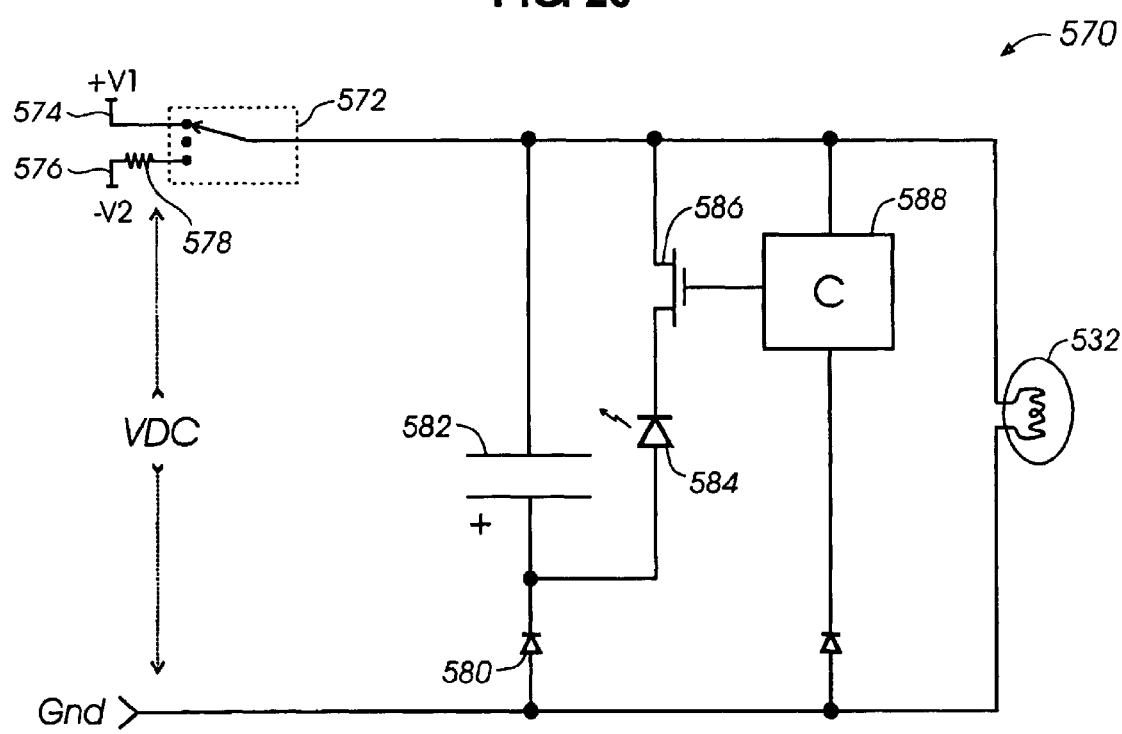
FIG. 27 is a schematic of a circuit that may be utilized for powering the tip tracking system in response to reverse currents on the power line, according to another aspect of the present invention.

FIG. 27 exemplifies a circuit 570 in which power is supplied by reversing the voltage supplied to the lighting system. A three position switch 572 (ON1-OFF-ON2) may be utilized to replace existing two position switches (ON-OFF). A conventional voltage V1 is supplied to the navigation light 532 upon conventional switch activation. A second ON position brings a second, reverse polarity, voltage 576 for supplying power to the tip lighting, optionally with a current limiting device 578 exemplified as a resistor. Preferably the reversed voltage is generated at a lower voltage level so navigation lighting and strobe lighting will be activated. If the reverse voltage poses a danger to the particular strobe lighting circuit in use, then a diode or other blocking circuit may be utilized to prevent reverse current flow.

It will be appreciated that a reverse voltage may be easily generated from a switching power supply circuit, such as utilizing switched capacitors. The reverse voltage being preferably in the 3 to 6 volt range with limited current capability. Through a diode 580 a capacitor 582 is charged, such as a super capacitor, having sufficient capacitance for powering the laser 584 for a sufficient period of time. A switch 586 is regulated by control circuit 588, which can activate laser 584 for a period of time after the reverse voltage becomes available.

It should be noted that the use of reverse voltage may be limited to signal activation, wherein the control circuit power would be provided as depicted earlier in a non-reversed configuration. Alternatively, the power from the reverse voltage may be utilized to charge an energy storage device, such as a supercapacitor, for power the tip tracking system when the reverse voltage is no longer present. The reverse voltage may also be used for storing a control voltage on a capacitor. The charge stored on the capacitor can then be used to determine the duration of tip tracking system operation.

13.3.5 Superimposing Signals on the Navigation Power Wiring.

An embodiment may be implemented in which a momentary contact, such as within a modified switch element or an auxiliary switch is utilized for communicating activation and optionally spread angle and/or duration, to the tip tracking system. Upon activating the momentary switch, such as by pressing it the switch generates a signal down the navigation light/strobe power line for activating the tip tracker system.

Figure 28:
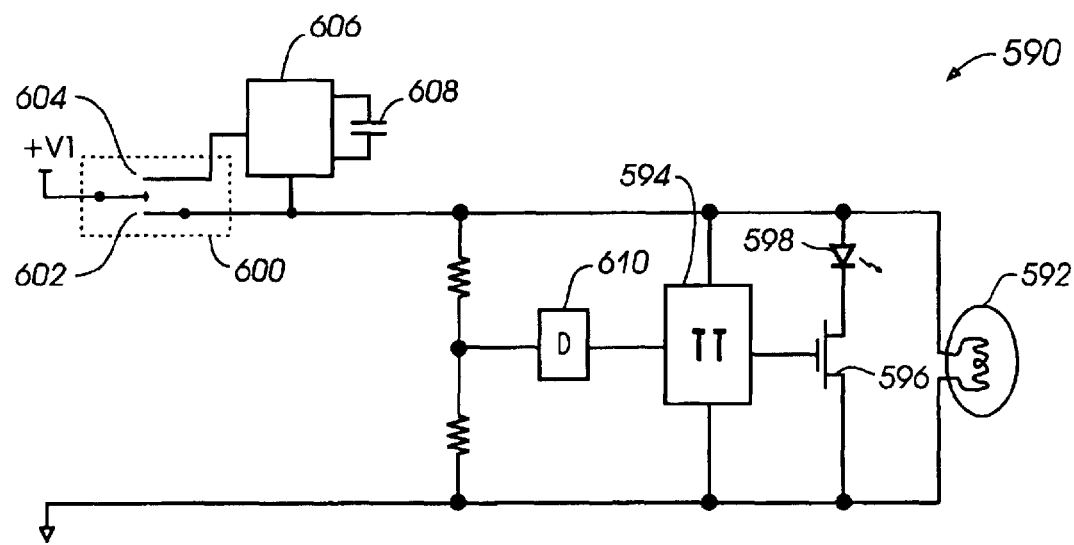
FIG. 28 is a schematic of a circuit for superimposing activation signals on a power line for controlling the tip tracker system, strobe, or other units, according to another aspect of the present invention.

FIG. 28 exemplifies replacing a conventional switch with a switch having an additional momentary contact that is engaged upon applying sufficient pressure to the switch while in the ON position. This additional momentary position, allows the pilot to communicate signals over the existing wiring to the navigation and strobe lighting.

A circuit 590 is shown with a navigation light 592, and a tip tracking system controller 594 which controls a switch 596 for modulating the power through laser diode 598. A switch 600 is configured with a first contact 602 that may assume an ON position for directing power +V1 down the wiring to navigation light 592. A second contact 604 is provided within switch 600 as a momentary switch, wherein power is routed to a power conversion module 606 which provides a charge storage device 608 and is connected to the wiring for transmitting a signal which is superimposed on the voltage +V1 for signaling the tip tracking system 594, which may detect the signal states using a detection circuit 610. For example, circuit 606 may generate a voltage that exceeds +V1 by using capacitor 608 in a switched capacitor mode, wherein the voltage on the wiring, upon application of charged capacitor 608 jumps to a higher voltage prior to the charge being depleted. The detector 610 then communicates that condition to the tip tracking system controller 594 so that the state of the laser light 598 may be properly modulated. It will be recognized that the voltage may be provided as an identifier comprising a sequence of bits, wherein the tip tracking system control circuit is capable of distinguishing the transitions from those associated with spurious noise.

It should also be appreciated that this method and circuit may be utilized for controlling the activation of a strobe light, or other lighting units within the aircraft that are connected to a single power source.

Figure 29:
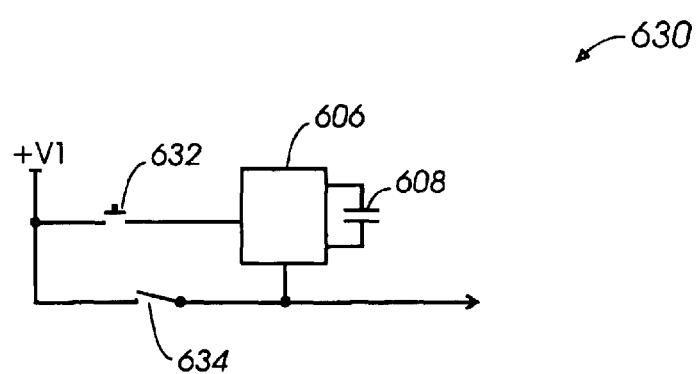
FIG. 29 is a schematic of a simple separate switch circuit for superimposing activation signals on a power line for controlling the tip tracker system according to an embodiment of the present invention.

FIG. 29 exemplifies one simple alternative 630 to the switch of FIG. 28, wherein a separate momentary push button switch 632 is connected, for use with a conventional ON-OFF switch 634, to a power conversion module 606 with capacitor 608. This allows the user to configure a separate switch for controlling Tip Tracker operation without the need of altering the wiring carried in the wing to the navigation and/or strobe lighting.

13.3.6 Operating Tip Tracking System from Self Contained Power.

It may be desirable to NOT have the unit connected to the aircraft power system, so that it can not effect the aircraft electrical system. Although properly designed electrical equipment is extremely reliable, this aspect of the invention may be desirable in some instances. The tip tracking system may be configured as an isolated system operating from its own power (i.e. battery such as lithium) and not connected into the aircraft power system battery. Activation of the lights may be via a remote control, or by sensing an ON/OFF/ON power transition within a specific time range. The power transitions can be sensed inductively, wherein the electrical system for the aircraft is left totally undisturbed.

The unit can additionally/alternatively sense the power to the strobes with another inductive loop that is conditioned and sensed by the controller. Upon activation of the strobe lights the laser system can be deactivated. Typically general aviation pilots taxi with only the navigation lights on, and then activate the strobes during a run up prior to taking the active runway for takeoff. Therefore, sensing of strobe activation can provide another simple means of deactivating the lasers and may be utilized separately or in combination with the other techniques described.

Alternatively, the unit can sense activation of the navigation lights and/or strobe lights by sensing the actual light output, such as using an optical detector. However, this form of sensing is generally more complicated and somewhat more prone to false detections.

Each wingtip lighting unit may be configured with a self contained power source, such as a 12V cylindrical lithium battery, as shown in FIG. 14 that may be preferably inserted into a receptacle from outside the unit without the need to remove the lighting system. The battery opening is preferably sealed, for example by using a cylindrical slotted aluminum plug having an O-ring to seal the battery compartment. The service life for the battery source under normal conditions is expected to at least exceed one year and should be operable for up to two years or three.

An inductive loop of wire wrapped around one or more of the wires carrying power to the navigation lights/strobe, or other form of power sensing, can generate a signal to activate battery power for a controller circuit, such as an eight bit, eight pin, PIC microcontroller from Microchip Incorporated. Once coming out of a reset condition the controller senses the power changes to the nav/strobe and determines if a predetermined set of conditions has occurred, such as the transitioning of the lighting from ON/OFF/ON within a period of up to about two seconds. If this occurs then the controller outputs an activation signal to activate the laser light and any optional electromechanical drive as may be used for instance for generating a circular pattern.

If an optional speed sensor switch element is provided then it would normally be set in the ON position and transition to OFF as the speed extends past taxi speed. This optional switch would be in series with the laser light and any electromechanical drive, wherein even though the controller was still generating an activation signal the speed sensor would block the current at beyond safe taxi speed.

It should be noted that the deactivation of the laser system can also provide an additional indicator to pilots that they are taxiing at an unsafe speed. Normally the pilot would complete the "close quarters" taxi operations within a couple of minutes and may then cycle the NAV (or strobes) through an OFF/ON cycle which is detected by the controller and used to deactivate laser power and controller unit power. The controller tracks the elapsed time from activation, and if they have not been otherwise deactivated the controller will at a predetermined time, such as 3 minutes, 5 minutes, or whatever the unit is implemented for (or for which a user selection value is read), discontinues the activation signal (turn off the laser and any electromechanical drivers) and turns its own power off such as biasing off a FET, as is commonly done on conventional small electronic apparatus.

Figure 30:
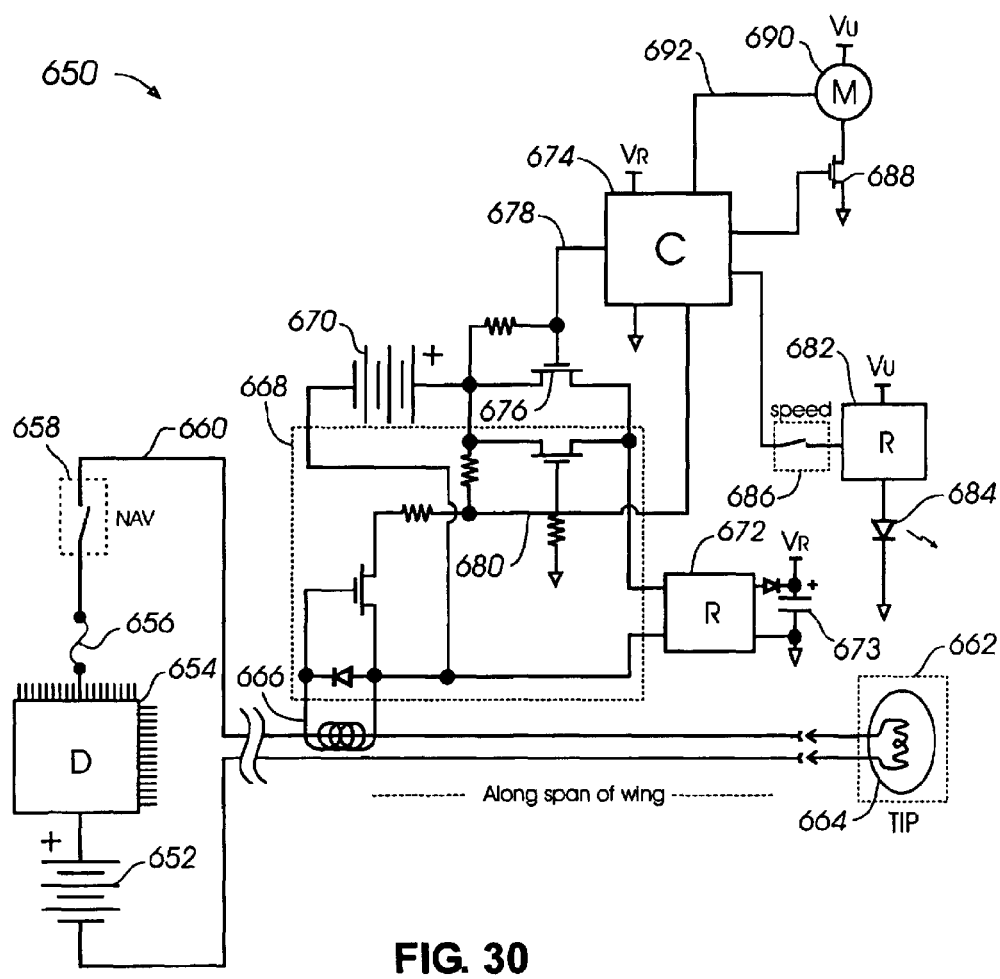
FIG. 30 is a schematic of a circuit for controlling the operation of the tip tracking system when operated from a separate power source according to an embodiment of the present invention.

FIG. 30 exemplifies an embodiment 650 of the use of a remote power source within the tip tracking system. The aircraft systems are shown with a battery source 652 connected through a power distribution system 654, fuse 656, cockpit switch 658 for NAV lights. The power from the NAV switch 660 (or may be used less preferably with strobe switch) is routed out to the wingtip navigation lights (NAV, NAV/strobe, or other lighting) 662 which are simply represented by the use of an incandescent light filament 664.

An inductive loop 666 is shown adjacent to or encircling one of the conductors (wires) leading out to the NAV strobe. It will be appreciated that since a large current (in the vicinity of one ampere) flows through the wire a significant voltage is induced in inductive loop 666. Power transitions sensed by inductor 666 trigger an activation circuit 668 wherein power from a remote power source 670 is switched on to regulator 672 in response to the sensed current transitions above a given threshold. Power source 670 is depicted as a battery providing unregulated output $V_u$, to regulator 672.

A controller circuit 674, preferably an inexpensive microcontroller, controls the operation of a power sustain circuit 676. Controller 674 upon exiting its reset condition can pull down an output 678 to latch power from remote battery 670. Controller 674 then senses the state of inductor 666 through a conditioning circuit 680 to detect the subsequent OFF/ON transition, which it may utilize to determine how power should be controlled.

If the correct pattern of current fluctuations is detected from inductor 666 then controller 674 outputs power to power supply 682 for a laser diode 684. If an air pressure sensing switch is utilized, or other activation prevention circuit 686, then the controller 674 although it generates an activation signal will not cause laser source 684 to activate. Controller 674 may additionally output signals for controlling related elements, such as electromechanical devices or other lighting. Controller 674 is shown connected to a driver 688 for a small motor 690 (i.e. paging motor) for generating a nutating pattern of laser illumination. Optionally, the controller may output an additional control signal 692 for selecting different patterns for motion of the laser source, such as changing the conical angle of nutation.

Controller 674 retains power to the circuit via sustain circuit 676, so that power is supplied to the controller and all related circuits, while controller 674 times the activation interval. After the predetermined interval has elapsed, controller 674 deactivates the projected illumination source 684 and any electromechanical outputs 688 and powers itself down by deactivating the sustain circuit 676 from the battery source. The circuit will be awakened in response to subsequent large switching transients found on the power line.

It should be appreciated that a rechargeable power cell, or fuel cell, may be utilized in place of the battery power described. For example a photocell may be utilized to collect energy stored on a power storage devices such as a super-capacitor. The photocell, or other photo responsive material, may be included on the top surface of the unit for charging the energy storage cell. It should be appreciated, however, that such an installation would be less preferred as such power sources are not generally sufficiently reliable.

14. Modulating Output of Patterned Illumination.

The output from the patterned illumination source may be modulated, preferably by a controller, to provide a number of effects and for providing added communication. The following being provided by way of example. The controller preferably modulates the illumination in a PWM (pulse width modulation) manner wherein the power to the laser diode is modulated at a fixed or variable frequency and for which the duty cycle may be altered to control the intensity.

Modulate the intensity of the projected illumination in response to detected ambient lighting, as described earlier in reference to FIG. 26. The tip tracker system may contain an optical sensor, or alternatively sense optical energy based on characteristics of the laser diode when in an off-state in response to ambient lighting. In this way high intensity output may be utilized at night with lower intensities being selected for night operations. This feature can significantly enhance the usability of the tip tracking system.

Increase apparent brightness and/or efficiency. Increased ability to discern the light output can result from modulating the intensity of the illumination. Furthermore, at non-maximum output power levels the illumination is more effective when controlled according to PWM control, and similar.

Communicate information to a remote location by modulating the laser light output. Some instances arise in which it may be desirable to communicate information from the aircraft to surrounding environment. By way of example, the laser light output may be modulated to communicate an aircraft identification. Optical detectors near the taxiways may be adapted to collect information on aircraft utilizing the taxiway, to better control the flow of traffic and to increase safety from ground operations, terrorism, and so forth. In addition, as the aircraft taxies to a fuel service island the identification of the aircraft can be automatically registered to enhance the process of charging and distributing the fuel.

If the preceding technique is being utilized as a security measure, it may be generalized to including an RF transmitter coupled to the power bus of the aircraft, or from the magneto power (if the aircraft could be started without power to the bus). The RF transmitter would be configured to generate an identifier for a short period of time (i.e. periodically during ground ops, or periodically over a short interval) so that stolen aircraft could be more readily identified.

15. Conclusion.

It should be appreciated that the foregoing examples, may include navigation and/or strobe lighting that is used in conjunction with the tip tracking system described within the present invention. Furthermore, these circuits are provided by way of example and may be adapted by one of ordinary skill in that art without creative efforts and without departing from the teachings of the present invention.

A number of implementation examples for the tip tracker system have been shown by way of example in the previous description, however, a number of variations may be implemented by one of ordinary skill without the need of creative efforts. The light sources have been shown utilizing laser lights, however, it will be recognized that other light sources are capable of functioning to project beams of light through a pattern so that the reflection can be recognized. Various mounting configuration were shown by example, however, the tip tracker may be mounted in various other configurations in which the light is projected forward of the travel of the surface to be protected.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An illumination bulb module configured for receipt within a bulb receptacle of a lighting system, comprising:
 a bulb housing adapted for receiving power from a bulb receptacle into which it is inserted;
 at least one illumination element connected within said housing and adapted to generate a multidirectional lighting pattern; and at least one laser diode illumination source connected within said housing, adapted for directing a narrow beam of illumination in a desired direction.

2. An illumination bulb module as recited in claim 1, wherein said lighting system is an aircraft lighting system.

3. An illumination bulb module as recited in claim 2;
 wherein said aircraft lighting system is a navigation or strobe lighting circuit;
 wherein said laser illumination source is configured for being directed substantially horizontally when the aircraft is in a taxi attitude.

4. An illumination bulb module as recited in claim 2, wherein said lighting system is an automotive, truck, motorcycle, or boat lighting system.

5. An illumination bulb module as recited in claim 1, further comprising a controller circuit within said housing, said controller circuit adapted for controlling the operation of said laser diode element.

6. An illumination bulb module as recited in claim 5, wherein said controller circuit regulates the power to said laser diode illumination element.

7. An illumination bulb module as recited in claim 5, wherein said controller circuit controls the activation and duration that said laser diode illumination element is activated.

8. An illumination bulb module as recited in claim 1, wherein said multidirectional illumination element comprises at least one incandescent element, at least one light emitting diode, or a combination thereof.

9. An illumination bulb module as recited in claim 1, wherein said illumination bulb module has a shape and electrical connections configured to allow it be received within conventional incandescent bulb receptacles.

10. An illumination bulb module as recited in claim 9, wherein said illumination bulb module has a base configured for insertion within a bayonet lighting receptacle.

11. An illumination bulb module as recited in claim 1, wherein said predetermined direction of said laser diode illumination source can be adjusted to a desired direction for a given application.

12. An illumination bulb module as recited in claim 11, further comprising a adjustable mirror, lens, or light pipe coupled to said housing for directing said narrow beam of illumination from said laser diode.

13. An illumination bulb module as recited in claim 1, further comprising a reflector within at least a portion of the interior of said illumination bulb.

14. An illumination bulb module as recited in claim 1, further comprising means of directing said narrow beam of illumination from said laser diode illumination source into a two dimensional illumination pattern.

15. An illumination bulb module as recited in claim 14, wherein said means of directing said narrow beam into a two-dimensional illumination pattern comprises an actuator for modulating the direction of said laser diode illumination source or the reflection therefrom.

16. An illumination bulb module as recited in claim 15, wherein said actuator is selected from the group of actuating devices consisting essentially of motors, muscle wire, and movable mirror assembly.

17. An illumination bulb module as recited in claim 15, wherein said two-dimensional illumination pattern comprising a nutating pattern.

18. An illumination bulb module as recited in claim 5:

wherein said controller circuit is configured to control the operation of said laser diode illumination source in response to signals received over the electrical power connections of the bulb receptacle into which it is electrically coupled;

wherein said signals comprise operations beyond activating the light in response to providing a sufficient voltage and deactivating by terminating the supply of voltage.

19. An illumination bulb module as recited in claim 15:

wherein said signals to which controller circuit is responsive comprise detecting a reversed voltage level or a predetermined number of power transitions;

wherein said predetermined number of power transitions comprises at least two transitions within a predetermined interval;

wherein said predetermined number of power transitions occur between the OFF and ON power states.

* * * * *